United States Patent
Stork et al.

(10) Patent No.: US 7,356,611 B1
(45) Date of Patent: Apr. 8, 2008

(54) METHOD AND APPARATUS FOR PERMISSIONS BASED ACTIVE DOCUMENT WORKFLOW

(75) Inventors: David G. Stork, Portola Valley, CA (US); Robert Jan van Glabbeek, Portola Valley, CA (US); Stephen Savitzky, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 736 days.

(21) Appl. No.: 10/054,749

(22) Filed: Jan. 18, 2002

Related U.S. Application Data

(63) Continuation-in-part of application No. 09/958,000, filed on Sep. 20, 2001.

(51) Int. Cl.
G06F 15/16 (2006.01)
(52) U.S. Cl. .................................. 709/239; 717/104
(58) Field of Classification Search ................ 709/239
See application file for complete search history.

(56) References Cited

U.S. PATENT DOCUMENTS

| | | | |
|---|---|---|---|
| 4,068,214 A | | 1/1978 | Patil |
| RE31,287 E | | 6/1983 | Patil |
| 4,644,461 A | | 2/1987 | Jennings |
| 4,700,187 A | | 10/1987 | Furtek |
| 4,866,605 A | * | 9/1989 | Nakano et al. ............... 703/13 |
| 5,029,080 A | * | 7/1991 | Otsuki ........................ 712/201 |
| 5,181,162 A | * | 1/1993 | Smith et al. ............. 707/104.1 |
| 5,257,363 A | * | 10/1993 | Shapiro et al. ............... 703/13 |
| 5,283,896 A | * | 2/1994 | Temmyo et al. ............ 718/104 |
| 5,291,427 A | * | 3/1994 | Loyer et al. .................. 703/13 |
| 5,481,668 A | * | 1/1996 | Marcus ........................ 715/839 |
| 5,490,097 A | * | 2/1996 | Swenson et al. .............. 700/95 |
| 5,515,490 A | * | 5/1996 | Buchanan et al. ........ 715/500.1 |

(Continued)

FOREIGN PATENT DOCUMENTS

DE 4301391 A1 8/1994

(Continued)

OTHER PUBLICATIONS

Programming Environment based on Petri nets, Documentation and User Guide Version 1.4, Professor Dr. Eike Best, Dipl. Inform. Dernd Grahlmann, Insitut fur Informatik, Nov. 1995.*

(Continued)

*Primary Examiner*—Jason D Cardone
*Assistant Examiner*—Ajay Bhatia
(74) *Attorney, Agent, or Firm*—Townsend and Townsend and Crew LLP

(57) ABSTRACT

Techniques for designing and processing a workflow that can be refined or modified based upon information associated with a document processed by the workflow. Since the author of the document may configure the information associated with a document that is used to determine if a workflow is to be modified, the present invention enables a document author, in addition to the workflow designer, to control processing of a document in a workflow. The documents themselves specify portions of the overall processing within a workflow net. Permissions information may be specified for the workflow and for the documents. The permissions information may specify which documents can modify the workflow, the manner in which the workflow is modified, and which documents can be processed according to the modified workflow.

67 Claims, 10 Drawing Sheets

U.S. PATENT DOCUMENTS

| | | | | |
|---|---|---|---|---|
| 5,524,241 | A | * | 6/1996 | Ghoneimy et al. ............ 707/10 |
| 5,548,506 | A | * | 8/1996 | Srinivasan ................... 709/206 |
| 5,555,179 | A | * | 9/1996 | Koyama et al. .............. 700/95 |
| 5,581,691 | A | * | 12/1996 | Hsu et al. ...................... 714/45 |
| 5,666,490 | A | * | 9/1997 | Gillings et al. ............. 709/238 |
| 5,721,959 | A | * | 2/1998 | Nakamura et al. ............ 716/11 |
| 5,742,283 | A | | 4/1998 | Kim |
| 5,774,661 | A | * | 6/1998 | Chatterjee et al. .......... 709/203 |
| 5,826,020 | A | * | 10/1998 | Randell ....................... 709/202 |
| 5,828,375 | A | * | 10/1998 | Nomura et al. ............. 715/764 |
| 5,845,303 | A | * | 12/1998 | Templeman ................ 715/517 |
| 5,848,271 | A | * | 12/1998 | Caruso et al. .............. 712/220 |
| 5,855,014 | A | * | 12/1998 | Smith ............................ 707/3 |
| 5,890,130 | A | * | 3/1999 | Cox et al. ..................... 705/28 |
| 5,893,074 | A | * | 4/1999 | Hughes et al. ................. 705/9 |
| 5,974,392 | A | * | 10/1999 | Endo ............................. 705/8 |
| 5,983,016 | A | | 11/1999 | Brodsky et al. |
| 5,999,911 | A | * | 12/1999 | Berg et al. ..................... 705/9 |
| 6,002,850 | A | * | 12/1999 | Sumino et al. ............. 719/315 |
| 6,011,830 | A | * | 1/2000 | Sasin et al. .............. 379/10.03 |
| 6,038,541 | A | * | 3/2000 | Tokuda et al. .............. 709/238 |
| 6,067,357 | A | * | 5/2000 | Kishinsky et al. ............ 700/95 |
| 6,144,955 | A | * | 11/2000 | Tsuiki et al. ................... 707/1 |
| 6,178,239 | B1 | * | 1/2001 | Kishinsky et al. ..... 379/266.07 |
| 6,225,998 | B1 | * | 5/2001 | Okita et al. ................. 715/853 |
| 6,256,598 | B1 | | 7/2001 | Park et al. |
| 6,314,422 | B1 | * | 11/2001 | Barker et al. ................ 707/10 |
| 6,502,087 | B1 | * | 12/2002 | Tsuiki et al. ................... 707/1 |
| 6,725,428 | B1 | * | 4/2004 | Pareschi et al. ............ 715/530 |
| 2002/0059089 | A1 | * | 5/2002 | Suzuki et al. ................. 705/8 |
| 2003/0055811 | A1 | * | 3/2003 | Stork et al. ..................... 707/1 |
| 2003/0144974 | A1 | * | 7/2003 | Chang et al. ................ 706/25 |
| 2004/0093585 | A1 | * | 5/2004 | Christodoulou et al. .... 717/104 |

FOREIGN PATENT DOCUMENTS

| | | |
|---|---|---|
| DE | 19621062 A1 | 11/1997 |
| JP | 7160773 A | 6/1995 |
| JP | 10049206 A | 2/1998 |
| JP | 10058288 A | 3/1998 |
| JP | 10124110 A | 5/1998 |
| JP | 10240714 A | 9/1998 |
| JP | 11328259 A | 11/1999 |

OTHER PUBLICATIONS

Meeting on XML/SGML based Interchange Formats for Petri Nets, Aarhus, Denmark, Jun. 26-30, 2000.*

The Petri Net Markup Language, Michael Weber, Humboldt-Universitat zu Berlin, Jun. 27, 2000.*

Following the Forces, Olaf Kummer et al, Jun. 28, 2000.*

Murata, T., "Petri nets: Properties, analysis and applications," Proceedings of the IEEE, vol. 77, No. 4, pp. 541-580, Apr. 1989.*

Lenz, K., "Modeling interorganizational workflows with XML nets," System Sciences, 2001. Proceedings of the 34th Annual Hawaii International Conference on , vol., No., pp. 10 pp.-, Jan. 3-6, 2001.*

Aceto, L., and Hennessy, M., "Adding Action Refinement to a Finite Process Algebra," Information and Computation, 115, pp. 179-247 (1994).

Anonymous, "Petri net approach to checking software structural change correctness in operation—using changed region analysis to indentify parts still needing further checking using set on linear expressions in logic relationship," RD 348009 A, p. 225, (Apr. 10, 1993).

Bai, Yue-Bin, Liu, Yi, Ma, Mian-She, and Zheng, Shou-Qi, "Research and Implementation of Distributed Security Administration System for Remote Access Based on NAS," Mini-Micro Systems, vol. 21, No. 11, pp. 1197-2000 (Nov. 2000) English abstract only.

Bauderon, M. and Courcelle, B. "Graph Expressions and Graph Rewriting," Mathematical Systems Theory, vol. 20, pp. 83-127, (1987).

Chun, Yang, "Application and Research of a User Name and Password Authentication Based on SOCKS V5," Journal of University of Electronic Science and Technology of China, vol. 30, No. 2, pp. 162-165 (Apr. 2001) English abstract only.

Doyle, E.M., Taveres, S.E., and Meijer, H., "Computer Analysis of Cryptographic Protocols Using Colored Petri Nets," 18th Bienniel Symposium on Communication Symposium Proceedings, pp. 194-199 (Jun. 1996).

El-Hadidi, M.T., Hebazi, N.H., and Aslan, H.K., "Implementation of a Hybrid Encryption Scheme for Ethernet," Proceedings of IEEE Symposium on Computers and Communications, Alexandria, Egypt, pp. 150-156, (Jun. 1995).

Genrich, H.J., and Lautenbach, K., "System Modelling With High-Level Petri Nets," Theoretical Computer Science, 13, pp. 109-136, (1981).

Juszczyszyn, K., "Secure Information Flow Model for Corporate Network," Information Systems Architecture and Technology ISAT 2000, pp. 272-279, (2000).

Karri, R., "A Security Imbedded Authentication Protocol," IEEE INFOCOM '88—The Conference on Computer Communications Proceedings, pp. 1105-1109 (Mar. 1988).

Kramer, B., "Rule-Enhanced Petri Nets for Software Process Modeling," SEKE '94—The 6th International Conference on Software Engineering and Knowledge Engineering, pp. 493-500 (Jun. 1994).

Milner, R., "Communicating and Mobile Systems: The η—Calculus," Cambridge University Press, Cambridge, UK, pp. 1-161, (1999).

Mirsky, E., and Dehon, A., "MATRIX: A Reconfigurable Computing Architecture with Configurable Instruction Distribution and Deployable Resources," Proceedings of IEEE Workship of FPGAs for Custom Computing Machines, pp. 157-166, (1996).

Murata, T., "Petri nets: Properties, Analysis and Applications," Proceedings of the IEEE, vol. 77, No. 4, pp. 541-580, (Apr. 1989).

Morton, C.M., Robart, L.C., and Tavares, S.E., "Decomposition Techniques for Cryptographic Protocol Analysis," 1994 Canadian Conference on Electrical and Computer Engineering, pp. 335-339, (Sep. 1994).

Ohta, A., Ohba, T., and Hisamura, T., "On Liveness of Subclasses of Petri Nets with Permission or inhibitor Arcs," Trans. of the Society of Instrument and Control Engineers, vol. 31, No. 10, pp. 1722-1729 (1995).

Schmidt, H.W., "Prototyping and Analysis of Non-Sequential Systems Using Predicate-Events Nets," Journal Systems Software, vol. 15, pp. 43-62, (1991).

Valette, R., "Analysis of Petri Nets By Stepwise Refinements," Journal of Computer and System Sciences, vol. 18, No. 1, pp. 35-46, (1979).

Van Der Aalst, Wil M.P., "Interorganizational Workflows: An approach based on message sequence charts and Petri Nets," website address: http://tmitwww.tm.tue.nl/staff/wvdaalst/Publications/p70.pdf , from In Proceedings of PROLAMAT'98, IFIP Transactions, Trento. pp. 1-43, (1998).

Van Der Aalst, Wil M.P., "Interorganizational Workflows: An approach based on message sequence charts and Petri Nets," Systems Analysis—Modelling—Stimulation (SAMS), vol. 34, pp. 335-367, (1999).

Van Der Aalst, Wil M.P., Woflan: a Petri-Net-Based Workflow Analyzer, vol. 35, No. 3, pp. 345-357, (1999).

Van Der Aalst, Wil M.P., "Three Good Reasons for Using a Petri-Net-Based Workflow Management System," Information and Process Integration in Enterprises: Rethinking Documents, Kluwer Academic Publishers, Norwell, MA, pp. 161-182 (1998).

Van Glabbeek, R., and Goltz, U., "Refinement of Actions in Causality Based Models," Proceedings of the Rex Workshop—Stepwise Refinement of Distributed Systems Models, Formalisms, Correctness, Mook, The Netherlands, pp. 267-300, (May 29-Jun. 2, 1989).

Van Glabbeek, and R., Weijand, P., "Branching Time and Abstraction in Bisimulation Semantics," Journal of the ACM, vol. 43, No. 3, pp. 555-600 (May 1996).

Weitz, W., "SGML Nets: Integrating Document and Workflow Modeling," Proceedings of the 31st Annual Hawaii International Conference on System Sciences, IEEE, pp. 185-194 (1998).

Kohler et al., "Liveness Preserving Composition of Behaviour Protocols for Petri Net Agents," Technical Report, Universitat Hamburg, Fachbereich Informatik (2001).

Brauer et al., "Survey of Behaviour and Equivalence Preserving Refinements of Petri Nets," Grzegorz Rozenberg, eds., in Advances in Petri Nets 1990, No. 483, in Lecture Notes in Computer Sciences (LNCS), pp. 1-46.

Genrich et al., "Predicate / Transition Nets," from *Lecture Notes in Computer Science*, Goos and Hartmanis eds., vol. 254, Petri Nets: Central Models and Their Properties, Brauer et al., eds., pp. 208-247, Springer-Verlag (1987).

Kohler et al., "Modeling the Structure and Behaviour of Petri Net Agents," from *Lecture Notes in Computer Science*, vol. 2075, pp. 224-241 (2001), Colom & Koutny eds., Springer-Verlag (2001).

Smith, E., "Principles of High-Level Net Theory," from *Lecture Notes in Computer Science*, vol. 1491, pp. 174-210 (1998), Reisig & Rozenberg Eds., Springer-Verlag (1998).

Valk, R., "Petri Nets as Token Objects, An Introduction to Elementary Object Nets," from *Lecture Notes in Computer Science*, vol. 1420, pp. 1-25, Springer-Verlag (1989).

* cited by examiner

METHOD AND APPARATUS FOR PERMISSIONS BASED ACTIVE DOCUMENT WORKFLOW

CROSS-REFERENCES TO RELATED APPLICATIONS

The present application claims priority from and is a continuation-in-part (CIP) application of U.S. application Ser. No. 09/958,000, filed Sep. 20, 2001, the entire contents of which are herein incorporated by reference for all purposes.

BACKGROUND OF THE INVENTION

The present invention relates to document workflow systems and more particularly to techniques for using active documents to control processing in document workflow systems.

Document workflows define a sequence of operations that are to be performed on one or more documents. Document workflows are increasingly being used in several applications and environments to control and automate processing of documents. For example, document workflows are being used to process loan applications, employment applications, insurance claims, purchase requisitions, online credit verifications at points of purchase, patient medical records, distribution and sign-off on memos in an office environment, editorial steps in a production (e.g., production of a magazine, newspaper), and other document-based processes.

In a traditional document workflow, a workflow designer specifies the processing steps to be applied to a document. Various different techniques and applications are presently available enabling the workflow designer to model and design document workflows. These include systems such as COSA, Visual Workflow, Forte Conductor, Verve Workflow, iFlow, Inconcert, SAP R/3 Workflow, and others. More recently, Petri nets have been used to represent document workflows. A Petri net is a structure used in the computer science field to represent a concurrent process. Petri nets provide a formal foundation for designing document workflow processes.

A Petri net representing a document workflow comprises one or more "tasks" or "transitions" and one or more "local states" or "places." The "tasks" or "transitions" (represented by squares in a Petri net) specify the operations to be performed on a document in the workflow. The "local states" or "places" (represented by circles in a Petri net) specify the status of the document in the workflow. The casual flow through the Petri net is indicated by arrows or arcs linking transitions to states and states to transitions (but not states to states or transitions to transitions). In a Petri net representation, documents that are processed by the workflow are often represented as structureless tokens that flow through the Petri network.

FIG. 1 depicts a simplified Petri net 100 representing a simplified document workflow that may be implemented a newspaper publisher's office. Petri net 100 specifies tasks or transitions (represented by squares) and states (represented by circles) linked by arcs. As depicted in FIG. 1, Petri net 100 comprises place nodes 102, 106, 112, 116, 120, and 124, and transition nodes 104, 108, 110, 114, 118, and 122. As depicted in FIG. 1, a reporter in the field may be ready to submit a draft article for publication (place 102). The reporter may submit the draft article by either faxing (transition 104) the article or emailing (transition 110) the draft article to the newspaper editorial office. Place 106 indicates that the article has been faxed. If the article is faxed, then it is electronically scanned at the editorial office (transition 108) to create an electronic version (place 112). If the reporter submits the draft article via email (transition 110), the electronic version is directly available, as indicated by place 112. The electronic version of the article is then logged (transition 114). Place 116 indicates that the article has been logged. The electronic document is then passed to an editor who edits the article (transition 118). Place 120 indicates that the electronic document has been edited. The article is then printed (transition 122). Place 124 indicates that the article has been printed.

In a conventional workflow system such as that represented by Petri net 100 depicted in FIG. 1, a workflow designer predefines all of the transitions and places in the workflow. Once the workflow has been designed, the author of the document (e.g., the reporter) cannot modify the workflow. For example, if the draft article document submitted by the reporter is written in Japanese, the workflow depicted in FIG. 1 cannot be modified by the reporter to accommodate a step of translating the document from Japanese to English. In order to accommodate a new operation or transition, the workflow designer would have to create an entirely new workflow for a Japanese document. This new workflow could then be customized by the workflow designer to process Japanese documents but could not be used for English documents. Accordingly, conventional workflow techniques cannot be modified by the author of a document based upon characteristics of the document. Conventional workflow systems ignore information associated with the documents being processed (e.g., contents of the documents). As a result, traditional workflow techniques do not facilitate modifications or refinements of a pre-defined workflow based upon characteristics and/or contents of the documents being processed.

In light of the above, there is a need for enhanced workflow techniques that allow a workflow to be modified by an author of a document processed by the workflow based upon characteristics of the document or based upon information associated with the document.

BRIEF SUMMARY OF THE INVENTION

The present invention provides techniques for designing and processing a workflow that can be refined or modified based upon information associated with a document processed by the workflow. Since the author of the document may configure the information associated with a document that is used to determine if a workflow is to be modified, the present invention enables a document author, in addition to the workflow designer, to control processing of a document in a workflow. As a result, according to the teachings of the present invention, the documents themselves specify portions of the overall processing within a workflow net. Permissions information may be specified for the workflow and for the documents. The permissions information may specify which documents can modify the workflow, the manner in which the workflow is modified, and which documents can be processed according to the modified workflow.

According to an embodiment of the present invention, techniques are provided for processing a document in a workflow system. A workflow controller system detects when a document is at a refinable place in a first workflow network, the first workflow network specifying a plurality of operations to be performed on the document including a first operation and a second operation, the refinable place occurring at a location in the first workflow network after the first operation and before the second operation is performed on the document. The workflow controller then determines, when the document is at the refinable place, if a second workflow network specified by the document is permitted to be attached to the refinable place of the first workflow network, the second workflow network specifying one or more operations to be performed on the document. If the second workflow network specified by the document is permitted to be attached to the refinable place of the first workflow network, the second workflow network is attached to the refinable place of the first workflow network such that the document is processed according to the second workflow network before the second operation specified by the first workflow network is performed on the document.

According to another embodiment of the present invention, techniques are provided for processing a document according to a first workflow network, the first workflow network specifying a plurality of operations to be performed, the plurality of operations including a first operation and a second operation following the first operation. A workflow controller determines, subsequent to performing the first operation and before performing the second operation, if the document is permitted to be processed by a second workflow network specified by the document, the second workflow network specifying one or more operations to be performed on the document. If the document is permitted to be processed by the second workflow network, then the document is processed according to the second workflow network before the second operation specified by the first workflow network is performed.

The foregoing, together with other features, embodiments, and advantages of the present invention, will become more apparent when referring to the following specification, claims, and accompanying drawings.

DETAILED DESCRIPTION OF THE INVENTION

Figure 1:
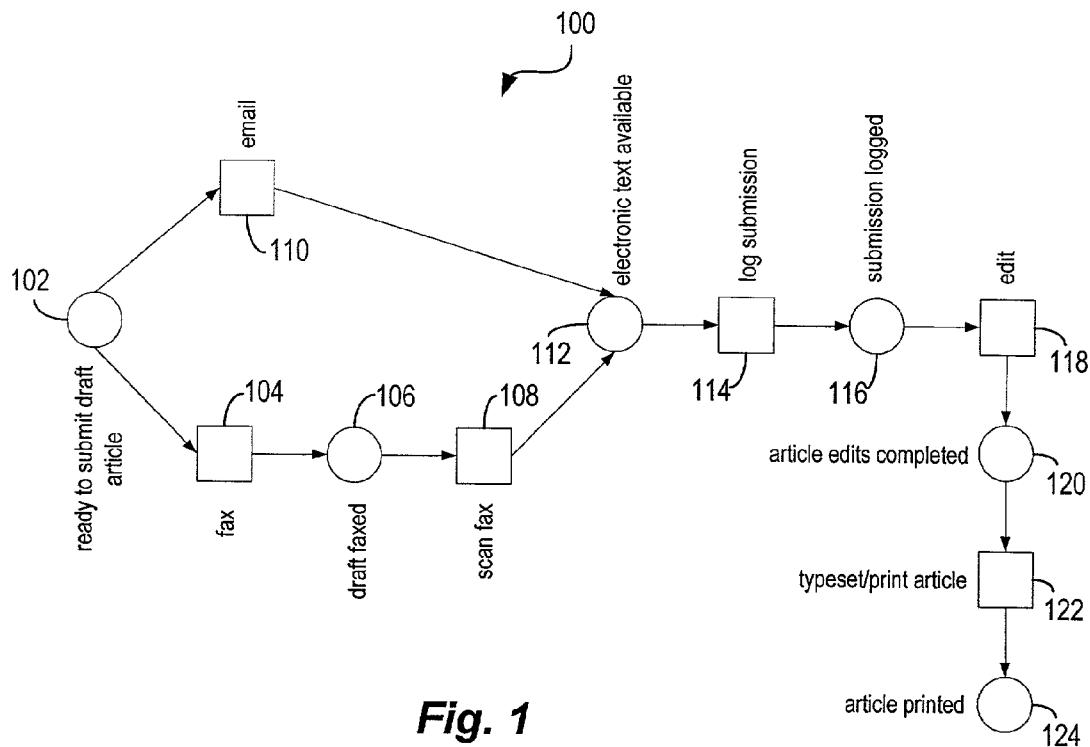
FIG. 1 depicts a simplified Petri net representing a simplified document workflow that may be implemented a newspaper publisher's office.

The present invention provides techniques for designing and processing a workflow that can be refined or modified based upon information associated with a document processed by the workflow. Since the author of the document may configure the information associated with a document that is used to determine if a workflow is to be refined, the present invention enables a document author, in addition to the workflow designer, to control processing of a document in a workflow. As a result, according to the teachings of the present invention, the documents themselves specify portions of the overall processing within a workflow net.

According to the teachings of the present invention, a workflow designer may specify a workflow that comprises one or more places (referred to as "refinable places") that can be refined or modified based upon information associated with a document processed by the workflow. A document author can associate information with a document to specify how a refinable place in the workflow net will be refined or modified. The present invention thus allows a workflow designer to set general constraints within which the document author can control processing of the document in the workflow. According to an embodiment of the present invention, permissions information may be specified for the workflow comprising one or more refinable places and for the documents. The permissions information may specify which documents can refine a particular refinable place, the manner in which the refinable place is refined, and which documents (represented as tokens) can execute a particular node's refinement net in a workflow net.

As indicated above, the present invention provides document workflows that contain one or more refinable places that may be refined or modified based upon information associated with a document processed by the workflow. Since the documents themselves comprise information that controls the overall processing within the workflow net, the documents are referred to as "active documents." Accordingly, the term "active document", as used in this application, is intended to refer to any document that comprises information (called "control information") that may be used to refine or modify a refinable place in a workflow.

According to an embodiment of the present invention, the control information that controls refinement of a refinable place is in a form that can be read and interpreted by workflow controller system or by a machine or device that is configured to process the document as part of the document workflow. For example, the control information associated with a document may be part of the document's contents but is distinguishable from the data contents (e.g., text) of the document. Accordingly, if the document is a file, the data and control may be intermixed so long as each is tagged and separable. In alternative embodiments, the control information may be part of a header or footer of a document, a barcode associated with the document, and the like. Active documents thus carry both data information ("text") and control information ("control") and may be represented by tokens in a Petri net representation of the workflow.

A workflow that is configured to process an active document is referred to as an "active document workflow." Accordingly, the term "active document workflow", as used in this application, is intended to refer to any workflow that is configured to process an active document.

The control information may specify tasks for processing the document. Example of tasks that may be specified by the control information may include "translate paragraph 2 from French to English," "convert entries in table 5 from Japanese yen into U.S. dollars using last October's exchange rate," "send a copy of this document to every person in the international news department," "send a return receipt to the sender," "print this letter on corporate letterhead and mail it to the following address," "encrypt this document text using PGP," "determine the name of the recipient's corporate president and replace every occurrence of 'president' in this document with his or her name," "change the text from one column to two column, except for tables and the appendix," "route this document to the CFO and request an acknowledgment; if an acknowledgment is received, pass the document to the next stage in the target workflow, otherwise encrypt the document and then pass the document to the next stage," or combinations of the aforementioned or other operations.

Like other workflows, active document workflows may also be represented using Petri nets comprising transitions (represented by squares) and places (represented by circles). According to the teachings of the present invention, a Petri net representing an active document workflow comprises at least one refinable place (represented by a double circle). The "refinable place" in a Petri net representing an active document workflow represents a place in the net that can be refined or modified based upon control information associated with a document processed by the workflow. More specifically, according to an embodiment of the present invention, a refinable place in a first Petri net representing a first workflow corresponds to a node in the first net where a second Petri network representing a second workflow can be attached.

The process of attaching the second Petri network to the refinable space in the first Petri net is also referred to as "refinement" of the refinable place in the first Petri net. The second Petri net is referred to as a "refinement net" and the first Petri net is referred to as the "target net." Since a refinement network may specify one or more tasks and places (including one or more refinable places), refinement refers to the process of adding extra tasks to a target workflow process based upon control information associated with a document processed by the target workflow. Attaching a refinement Petri net to a refinable place of a target Petri net implies that when a document processed by a workflow represented by the target Petri net enters a place in the target workflow designated as the refinable place, the document is then routed and processed according to the workflow represented by the refinement net before the document is returned to the target workflow for further processing.

Figure 2A:
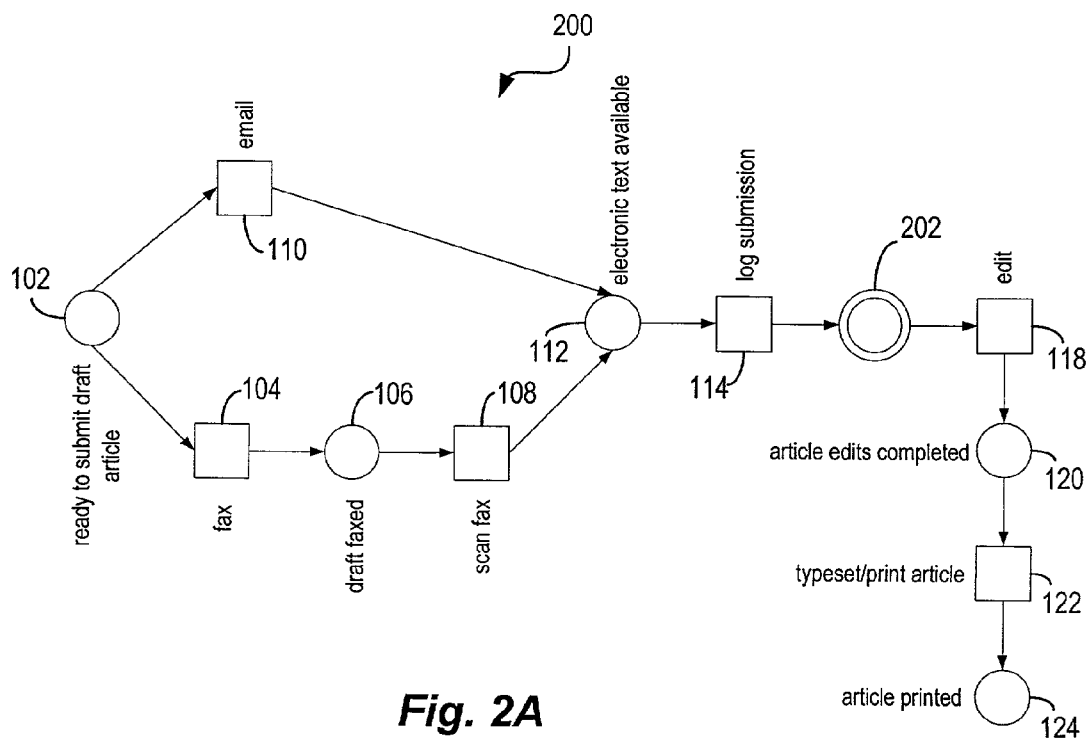
FIG. 2A depicts a simplified Petri net representing an active document workflow according to an embodiment of the present invention.

FIG. 2A depicts a simplified Petri net 200 representing an active document workflow according to an embodiment of the present invention. Petri net 200 is similar to Petri net 100 depicted in FIG. 1 except that place 116 (depicted in FIG. 1) has been replaced by a refinable place 202 (indicated by a double circle). Other transitions and places that are common to FIG. 1 and FIG. 2A have been labeled using like references.

Figure 2B:
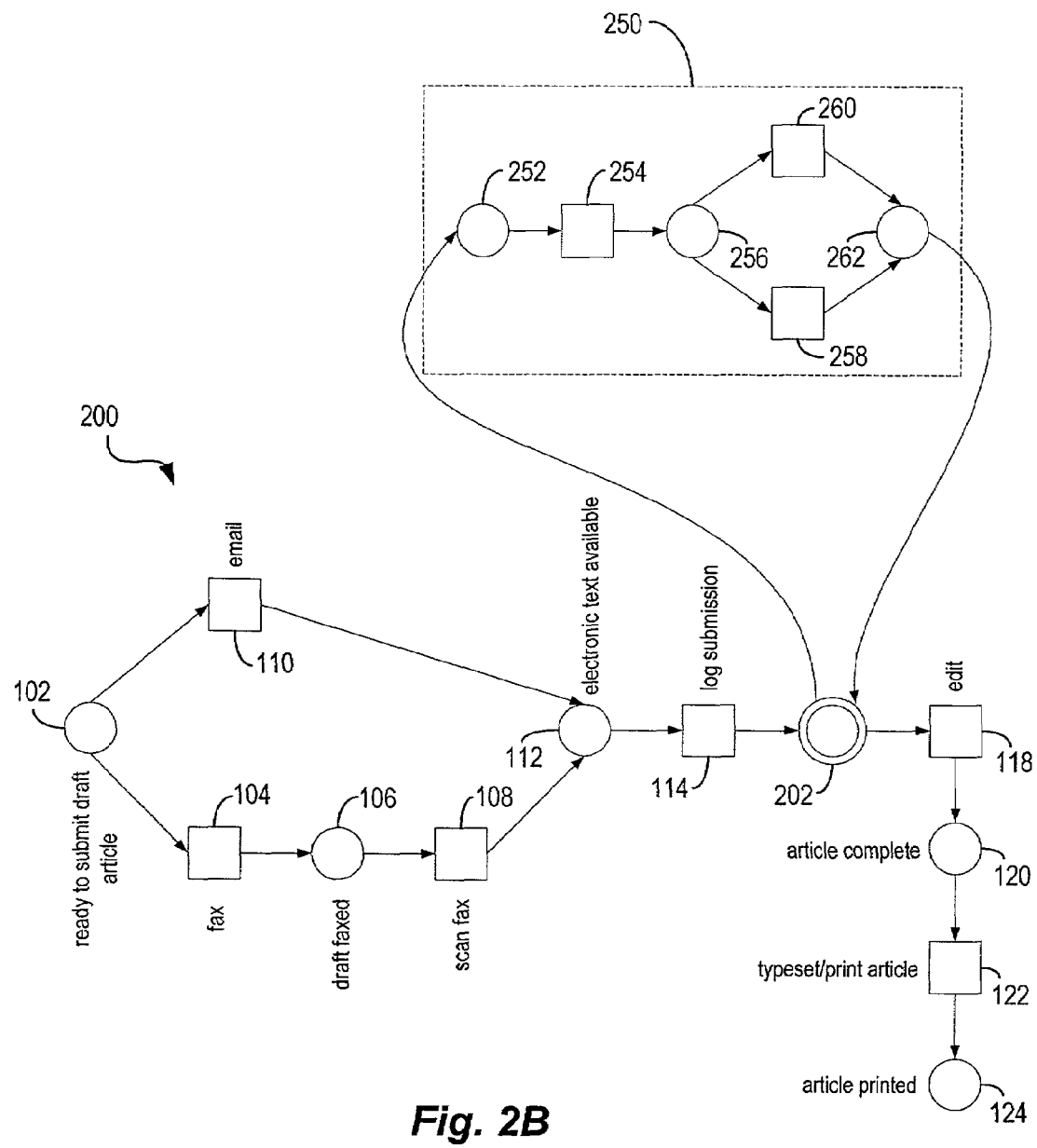
FIG. 2B depicts a simplified Petri net with a refinement net attached to a refinable space of the Petri net according to an embodiment of the present invention.

According to the teachings of the present invention, refinement is enabled when a document enters refinable place 202 of target network 200. When a document enters refinable place 202, control information associated with the document is read by a workflow processing system controlling the workflow represented by Petri net 200. Based upon the control information read from the document, a refinement net may be "attached" to refinable place 202. For example, as depicted in FIG. 2B, a refinement net 250 is attached to refinable space 202 in Petri net 200. As a result of the attachment, the document that triggered refinement of place 202 is then routed through the places and transitions of refinement net 250 before being passed on to transition 118 of Petri net 200 for further processing. Accordingly, attaching refinement Petri net 250 to refinable place 202 of target Petri net 200 implies that when a document processed by a workflow represented by target Petri net 200 enters a place (or status) in the workflow designated as the refinable place, the document is then routed and processed according to the workflow represented by refinement net 250 before the document is returned to the target workflow represented by target Petri net 200 for further processing. According to an embodiment of the present invention, the document being processed may comprise information specifying the refinement net (i.e., the refinement workflow) to be attached in to the refinable place. For example, the document may comprise information specifying refinement net 250.

Figure 3:
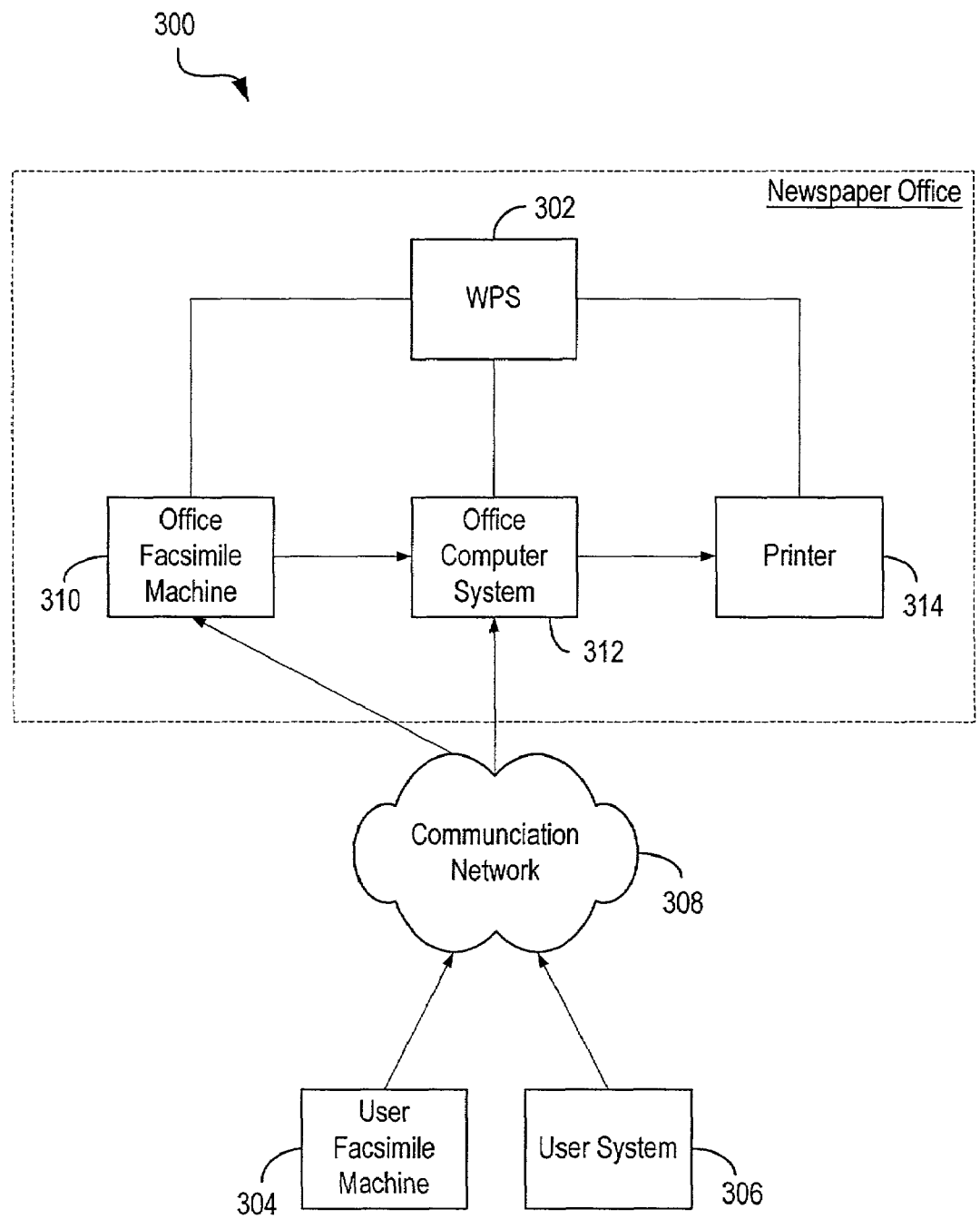
FIG. 3 is a simplified block diagram of a networked system that may be used to implement the workflow represented by the Petri net depicted in FIGS. 2A and 2B according to an embodiment of the present invention.

FIG. 3 is a simplified block diagram of a networked system 300 that may be used to implement the workflow represented by Petri net 200 (depicted in FIGS. 2A and 2B) according to an embodiment of the present invention. Networked system 300 comprises a plurality of computer systems and devices that may be used to perform operations on a document according to the workflow represented by Petri net 200 depicted in FIGS. 2A and 2B. Networked system 300 depicted in FIG. 3 is merely illustrative of an embodiment incorporating the present invention and does not limit the scope of the invention as recited in the claims. One of ordinary skill in the art would recognize other variations, modifications, and alternatives.

According to an embodiment of the present invention, workflow processing system (WPS) 302 is configured to control document processing according to the workflow represented by Petri net 200. In the embodiment depicted in FIG. 3, WPS 302 is coupled to facsimile machine 310, office computer system 312, and printer 314 in a newspaper office environment. WPS 302 is configured to monitor and control processing performed by these devices to implement the workflow represented by Petri net 200.

A reporter may submit a draft article to the newspaper office by either faxing (transition 104) the draft article using facsimile machine 304 or by emailing (transition 110) the draft article using user system 306. Examples of user system 306 include a PDA, a personal computer, a cellular phone, and the like. The draft article is then communicated to the newspaper office via communication network 308. Communication network 308 provides a mechanism for allowing communication of information from facsimile machine 304 and user system 306 to the newspaper office. Communication network 308 may itself be comprised of many interconnected computer systems and communication links. For example, communication network 304 may be a LAN, a wide area network (WAN), a wireless network, an Intranet, the Internet, a private network, a public network, a switched network, or any other suitable communication network.

If the reporter submits the article using facsimile machine 304, the article is received and scanned (per transition 108) by facsimile machine 310 in the newspaper office. WPS 302 detects receipt of the article by facsimile machine 310 and causes facsimile machine 310 to communicate the scanned electronic version of the draft article to office computer system 312 for further processing. If the reporter submits the article via email, the electronic version of the article is directly communicated to office computer system 312.

Upon detecting that office computer 312 has received an electronic version of the article, WPS 302 may then cause the article to be logged (per transition 114). The logging operation may be performed automatically by applications/modules executing on office computer 312 under control of WPS 302. Alternatively, a user of office computer 312 may be prompted to log the article.

Upon detecting that the article has been logged, WPS 302 may then determine that the document has entered a refinable place in the workflow and read the control information associated with the article. Further processing may be based upon the control information. In alternative embodiments, the control information may be read by a device or system (e.g., office computer system 312) coupled to WPS 302. If the control information specifies a refinement net to be attached to the refinable place, WPS 302 may cause operations specified by the workflow represented by the refinement net to be performed on the article. The workflow designer may configure the resources that are available for performing the operations specified by the refinement net. For example, if the article is written in Japanese and the refinement net specifies that the article is to be translated to English, the article may be translated to English using translation applications executing on office computer 312.

After operations specified by the workflow represented by the refinement net have been performed, the document may be further processed according to the workflow represented by the target Petri net. For example, according to Petri net 200 depicted in FIGS. 2A and 2B, an editor may then be allowed to make edits to the article (per transition 118). The editor may edit the article using office computer system 312 or any other system used by the editor. After all edits have been performed, the editor may send a signal (e.g., using office computer 312) to WPS 302 indicating that the edits have been completed. Upon receiving the signal, WPS 302 may cause the edited article to be communicated to printer 314. The article may then be printed using printer 314.

In the manner described above, operations specified by the workflow represented by Petri net 200 are formed by the systems depicted in FIG. 3 under control of WPS 302. Further, when refinement net 250 is attached to refinable place 202 of Petri net 200, the operations specified by the workflow represented by the refinement net are also performed under control of WPS 302. The processing performed by WPS 302 may be implemented by software modules executing on WPS 302 and/or by hardware modules coupled to WPS 302, or combinations thereof. While WPS 302 depicted in FIG. 3 is coupled to facsimile machine 310, computer system 312, and printer 314, in alternative embodiments of the present invention, WPS 302 may be coupled to more or less devices than those depicted in FIG. 3. In alternative embodiments, WPS 302 may also be embodied as part of one or more systems or devices depicted in FIG. 3. For example, WPS 302 may be embodied as part of office computer system 312. In other embodiments, processing preformed by WPS 302 may be performed by the various devices and systems that are configured to perform operations on a document as specified by the workflow.

The communication links used to connect the various systems depicted in FIG. 3 may be of various types including hardwire links, optical links, satellite or other wireless communications links, wave propagation links, or any other mechanisms for communication of information. Various communication protocols may be used to facilitate communication of information via the communication links. These communication protocols may include TCP/IP, HTTP protocols, extensible markup language (XML), wireless application protocol (WAP), protocols under development by industry standard organizations, vendor-specific protocols, customized protocols, and others.

Figure 4:
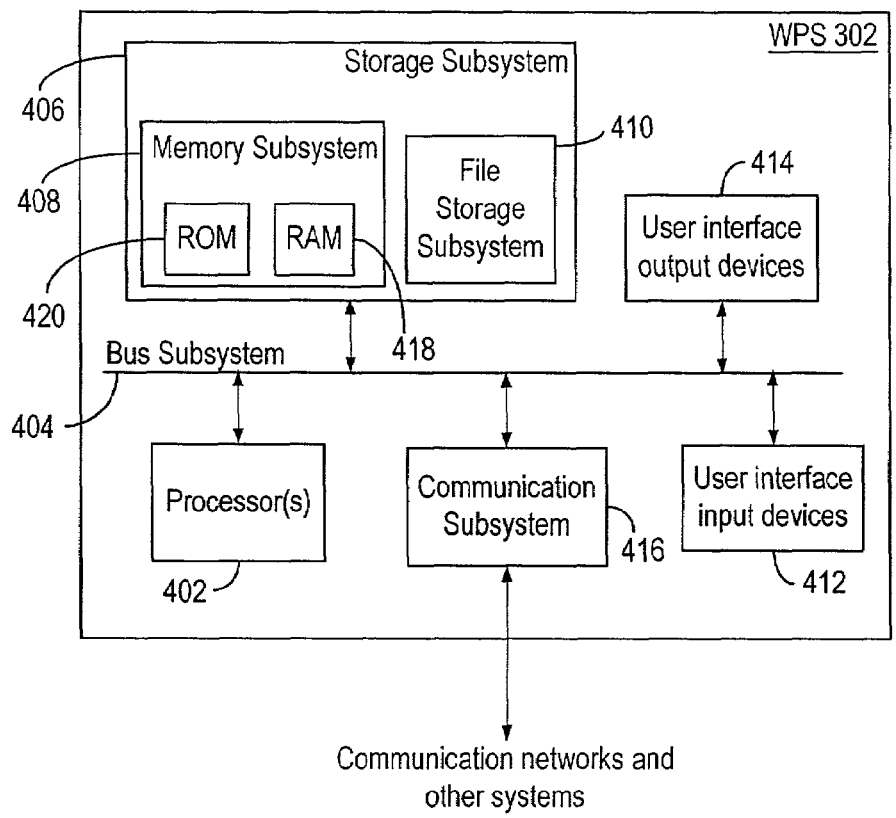
FIG. 4 is a simplified block diagram of a workflow processing system according to an embodiment of the present invention.

FIG. 4 is a simplified block diagram of a WPS 302 according to an embodiment of the present invention. As shown in FIG. 4, WPS 302 includes at least one processor 402, which communicates with a number of peripheral devices via a bus subsystem 404. These peripheral devices may include a storage subsystem 406, comprising a memory subsystem 408 and a file storage subsystem 410, user interface input devices 412, user interface output devices 414, and a communication subsystem 416. The input and output devices allow user interaction with WPS 302. A user may be a human user, a device, a process, another computer, and the like. Communication subsystem 416 provides an interface to other computer systems and communication networks such as communication network 308 depicted in FIG. 3.

Bus subsystem 404 provides a mechanism for letting the various components and subsystems of WPS 302 communicate with each other as intended. Although bus subsystem 404 is shown schematically as a single bus, alternative embodiments of the bus subsystem may utilize multiple busses.

User interface input devices 412 may include a keyboard, pointing devices such as a mouse, trackball, touchpad, a graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information using WPS 302.

User interface output devices 414 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term "output device" is intended to include all possible types of devices and ways to output information from WPS 302.

Storage subsystem 406 may be configured to store the basic programming and data constructs that provide the functionality of the computer system and of the present invention. For example, according to an embodiment of the present invention, software modules implementing the functionality of the present invention may be stored in storage subsystem 406. These software modules may be executed by processor(s) 402 of WPS 302. In a distributed environment, the software modules may be stored on a plurality of computer systems and executed by processors of the plurality of computer systems. Storage subsystem 406 may also provide a repository for storing various databases that may be used by the present invention. Storage subsystem 406 may comprise memory subsystem 408 and file storage subsystem 410.

Memory subsystem 408 may include a number of memories including a main random access memory (RAM) 418 for storage of instructions and data during program execution and a read only memory (ROM) 420 in which fixed instructions are stored. File storage subsystem 410 provides persistent (non-volatile) storage for program and data files, and may include a hard disk drive, a floppy disk drive along with associated removable media, a Compact Digital Read Only Memory (CD-ROM) drive, an optical drive, removable media cartridges, and other like storage media. One or more of the drives may be located at remote locations on other connected computers.

WPS 302 itself can be of varying types including a personal computer, a portable computer, a workstation, a computer terminal, a network computer, a mainframe, a kiosk, a personal digital assistant (PDA), a communication device such as a cell phone, or any other data processing system. Due to the ever-changing nature of computers and networks, the description of WPS 302 depicted in FIG. 4 is intended only as a specific example for purposes of illustrating an embodiment of WPS 302. Many other configurations of a computer system are possible having more or fewer components than WPS 302 depicted in FIG. 4.

As described above, according to the teachings of the present invention, a workflow designer specifies an active document workflow with one or more refinable places that serve as the loci of document-controlled operations that are based upon control information associated with the document. According to the teachings of the present invention, the workflow designer may also specify the resources available for such document-controlled processing at the refinable places. The document author in turn can configure the control information associated with a document to control how the resources provided by the workflow designer will be used for processing the document in the refinable place. The document author may also use the control information to specify a refinement workflow to be used for processing a document when the document arrives at a refinable place of a target network. This apportionment of the overall document processing control between the workflow designer and the document author allows the flexibility needed by different document workflow applications.

In fixed or rigid applications, a workflow designer may retain absolute control and may not permit any document-controlled processes in the workflow net. For example, the workflow designer may not allow any refinable space in a workflow net. An example of a rigid workflow is the processing of issued traffic tickets and fines at a police station or motor vehicle administration. Here the offender has no freedom in specifying how the ticket and the fine are to be processed.

In other applications, the workflow designer may permit some limited flexibility or freedom to the document author, perhaps only after important workflow processes have been completed, such as after logging or archiving of the original document has been completed. The workflow designer may also provide a set of resources (libraries) that implicitly limit the operations that can be invoked by the document author. An example in which modest freedom is granted to the document author is the newspaper workflow example that is depicted in FIGS. 2A and 2B. Here, a refinable place is defined only after the article has been logged (according to transition 114).

In other applications, the workflow designer may provide multiple refinable places in the workflow where the document author can control processing. The workflow designer may also provide a large library of basic operations/resources that can be invoked by the active document at the refinable place.

Figure 5:
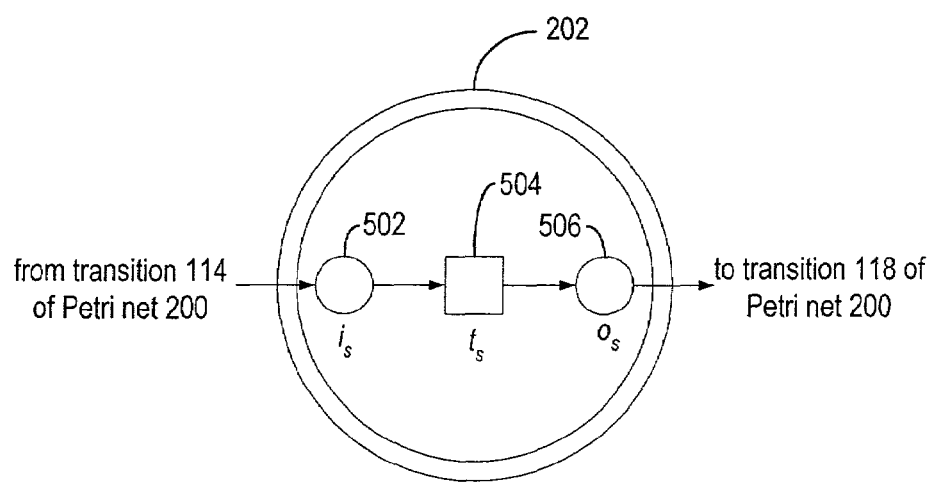
FIG. 5 depicts an input place, an output place, and a transition of a refinable place according to an embodiment of the present invention.

As indicated above, the present invention provides an active document workflow that may be represented by a Petri net comprising one or more refinable places. Let $S^R$ denote a set of all refinable places contained in a target Petri net representing an active document workflow. Accordingly, set $S^R$ comprises one or more refinable places $s_i$ where refinement nets may be attached based upon control information associated with a document processed by the workflow represented by the Petri net. According to an embodiment of the present invention, each refinable place s in set $S^R$ comprises an input place $i_s$, an output place $o_s$ and a transition $t_s$. FIG. 5 depicts an input place $i_s$ 502, an output place $o_s$ 506, and a transition $t_s$ 504 for refinable place 202 depicted in FIGS. 2A and 2B. The arcs leading to refinable place 202 go to $i_s$ 502, and the arcs emanating out of refinable place 202 come out of $o_s$ 506. Transition $t_s$ 504 has $i_s$ 502 as its only input place and $o_s$ 506 as its only output place. According to the teachings of the present invention, input place $i_s$ and output place $o_s$ serve as anchors for attaching a refinement net to the refinable place. The use of input place $i_s$ 502, output place $o_s$ 506, and transition $t_s$ 504 in the refinement process is explained below in further detail. In alternative embodiments, a refinable place may have multiple input and output places.

Figure 6:
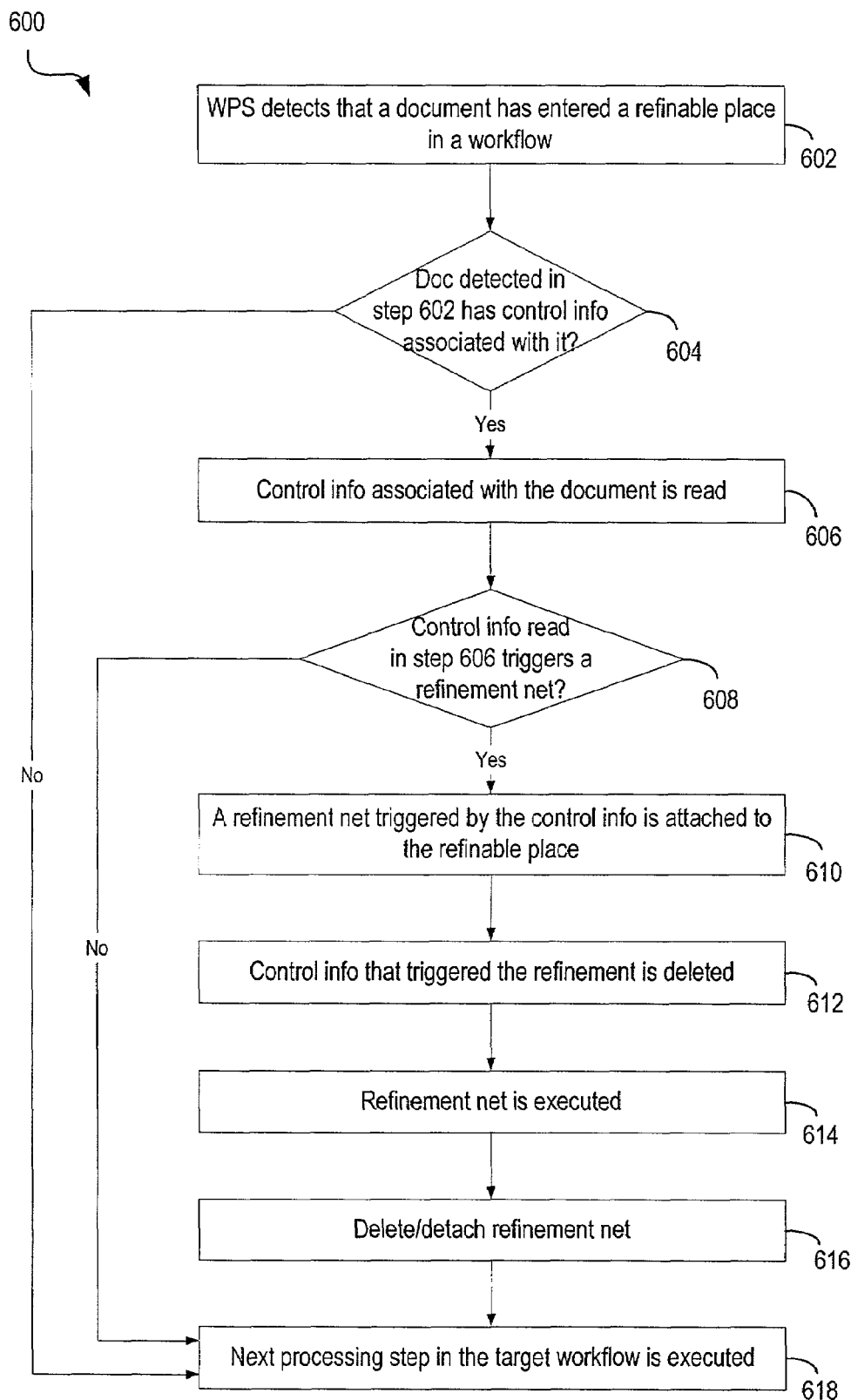
FIG. 6 is a simplified high-level flowchart depicting processing performed by a workflow processing system when a document enters a refinable place in a workflow net according to an embodiment of the present invention.

FIG. 6 is a simplified high-level flowchart 600 depicting processing performed by WPS 302 when a document enters a refinable place in a workflow net according to an embodiment of the present invention. Flowchart 600 depicted in FIG. 6 is merely illustrative of an embodiment incorporating the present invention and does not limit the scope of the invention as recited in the claims. One of ordinary skill in the art would recognize other variations, modifications, and alternatives.

The processing depicted in FIG. 6 may be performed by WPS 302. For example, software modules executing on WPS 302 may perform the processing. As indicated above, WPS 302 may be coupled to (as depicted in FIG. 3) or may be embodied in one or more devices or machines that are configured to perform operations on documents. The operations that are performed on a document according to a workflow may be performed automatically by one or more devices/machines without human intervention. Alternatively, the operations may require human intervention.

As depicted in FIG. 6, processing is initiated when WPS 302 detects that a document has entered a refinable place in a workflow net (step 602). According to an embodiment of the present invention, WPS 302 may monitor the status of a document as it is routed through the workflow in order to determine when the document enters a refinable place in the workflow. For example, in the system depicted in FIG. 3 that implements the workflow represented by Petri net 200 depicted in FIGS. 2A and 2B, WPS 302 may determine that a document has entered refinable place 202 upon detecting that the document has been logged per transition 114. In a Petri net representation of the workflow, when a document enters a refinable place (e.g., refinable place 202), the document is deposited in input place $i_s$ of the refinable place (e.g., $i_s$ 502 depicted in FIG. 5).

WPS 302 then determines if control information, if any, is associated with the document (step 604). If WPS 302 determines that the document does not have any control information associated with it, then processing continues with the next workflow processing step (step 618). For example, for the workflow represented by Petri net 200, if the document does not contain any control information then processing continues with transition 118.

According to an embodiment of the present invention, if the document does not contain any control information, the document is processed through transition $t_s$ (e.g., transition $t_s$ 504) of the refinable place and then deposited in output place $o_s$ (e.g., $o_s$ 506) of the refinable place from where it ready for the next operation in the workflow to be performed on it. According to an embodiment of the present invention, no operation is performed on the document in transition $t_s$ 504 (i.e., the document passes through unchanged). However, in alternative embodiments of the present invention, one or more operations specified by the workflow designer may be performed in transition $t_s$ 504.

If WPS 302 determines in step 604 that the document has control information associated with it, then the control information is read (step 606). The control information associated with the document may be read by WPS 302 or alternatively, WPS 302 may cause another device or system (e.g., computer system 312 depicted in FIG. 3) to read the control information.

WPS 302 then determines if the control information read in step 606 triggers a refinement net (step 608). The determination in step 608 is based upon the control information and information associated with the particular refinable place. For example, WPS may determine that the control information triggers a refinement net if the control information read in step 606 specifies a refinement net for the particular refinable place. In an alternative scenario, the document may have control information associated with it but the control information may not specify a refinement net for refinable place (e.g., the control information may specify a refinement net for some other refinable place). In this scenario, WPS 302 may determine that even though the document has control information associated with it, the control information does not trigger a refinement net for the particular refinable place.

If WPS 302 determines in step 608 that the control information associated with the document does not trigger a refinement net, then processing continues with the next workflow processing step (step 618). According to an embodiment of the present invention, if the document does not trigger a refinement net, the document is processed through transition $t_s$ (e.g., transition $t_s$ 504) of the refinable place and then deposited in output place $o_s$ (e.g., $o_s$ 506) of the refinable place from where it ready for the next operation in the workflow to be performed on it.

If WPS 302 determines in step 608 that the control information associated with the document triggers a refinement net a refinement net (R), the refinement net is attached to the refinable place (step 610). As described above, attaching a refinement net to a refinable place of a target net implies that the document is then routed and processed according to the workflow represented by the refinement net before the document is returned to the target workflow for further processing.

According to an embodiment of the present invention, each refinement net R comprises an input place $i_R$ and an output place $o_R$. When a refinement net is attached to a refinable place, the input place $i_R$ of the refinement net is attached to the input place $i_s$ of the refinable place and the output place $o_R$ of the refinement net is attached to the output place $i_R$ of the refinable place. The document is transferred from input place $i_s$ of the refinable place to input place $i_R$ of the refinement net. For example, in FIG. 2B, place 252 represents the $i_R$ of refinement net 250 and place 262 represents the output place $o_R$ of refinement net 250. Accordingly, when a document deposited in refinable place 202 triggers refinement net 250, the document is transferred from input place $i_s$ 502 of refinable place 202 to input place $i_R$ 252 of refinement net 250.

According to an embodiment of the present invention, the control information associated with the document being processed comprises information specifying the refinement net that is to be attached to the refinable place. Since the author of the document configures the control information, the present invention enables the author of the document to control and/or modify processing of the document in the workflow. For example, control information associated with a document processed by a workflow represented by Petri net 200 depicted in FIGS. 2A and 2B may comprise information specifying refinement net 250. In alternative embodiments, the information specifying a refinement net may be separable from the control information. As part of step 610, WPS 302 determines the refinement net specified by the document and attaches the specified refinement net to the refinable place.

According to an embodiment of the present invention, the control information that triggered the refinement net may then be deleted (step 612). This is done to ensure that the control information does not re-trigger the refinement net.

The refinement net is then executed until the document is deposited in output place $o_R$ of the refinement net (step 614). Execution of the refinement net implies that the sequence of operations specified by a workflow represented by the refinement net is performed on the document. The operations specified by the workflow represented by the refinement net may be performed by WPS 302 or by other devices or systems controlled by WPS 302. The operations may require human intervention. For example, the refinement net may specify a first operation indicating that the text of the document is to be converted from Japanese to English, and a second operation indicating that the document is to be encrypted using PGP. The translation and encryption operations are then performed in step 614.

According to an embodiment of the present invention, in a Petri net representation, after all the operations specified by the refinement net have been performed, the document is deposited into the output place $o_R$ of the refinement net. The document is then transferred from output place $o_R$ of the refinement net to output place $o_s$ of the refinable place. For example, the document is transferred from output place $o_R$ 262 of refinement net 250 to output place $o_s$ 506 of refinable place 202.

According to an embodiment of the present invention, the refinement net is then deleted or detached from the refinable space of the target Petri net (step 616). According to an embodiment of the present invention, the refinable net is deleted only if there is no document being processed by a workflow represented by the refinement net. Deletion of the refinement net results in contraction of the workflow Petri net. Processing then continues with step 618 wherein further operations specified by the target workflow are performed.

In alternative embodiments of the present invention, the refinement net may not be detached from the refinable place. In this embodiment, the refinement net remains attached to the refinable place even after the document that triggered the refinement net has already been routed or processed through the workflow represented by the refinement net. In this embodiment, step 614 is followed by step 618. In such an embodiment, a second document entering the particular refinable place may be routed or processed via the workflow represented by the refinement net triggered by the previous document.

According to the teachings of the present invention, a refinement net that is attached to a refinable place may itself comprise one or more refinable places. In other words, a workflow represented by a refinement Petri net may comprise one or more refinable places. Accordingly, a first refinement net attached to a refinable place in a target net may comprise one or more refinable places. When the first refinement net is being executed, a second refinement network may be attached to the refinable place of the first refinement net when a document comprising the requisite control information enters the refinable place of the first refinement net. The second refinement net may also comprise one or more refinable places, and so on. Accordingly, several levels of refinement nets may be attached to refinable places of refinement nets according to the teachings of the present invention. A hierarchy of workflow refinement nets may be thus be created according to the teachings of the present invention. In this hierarchy, the original workflow net (or the target workflow net) may be considered to be at the top level (or level "L"), the first refinement net that is attached to a refinable place of the target net is considered to be at the next level (level "L+1"), the second refinement net that is attached to a refinable place of the first refinement net is considered to be at level "L+2", and so on.

Figure 7A:
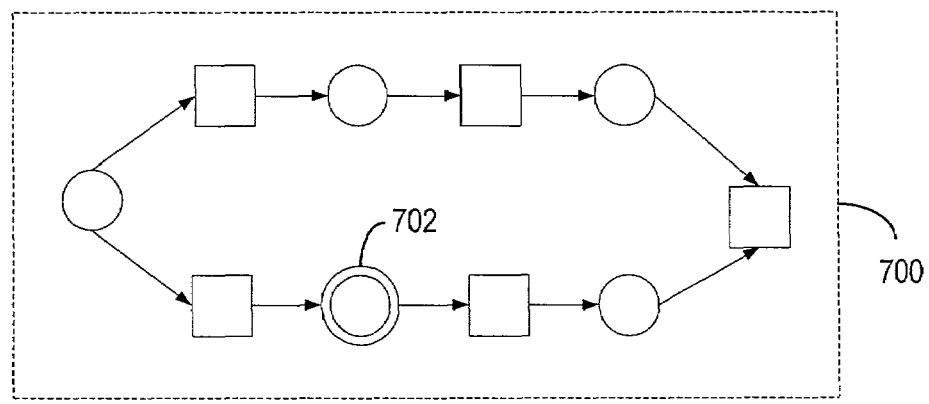
FIG. 7A depicts a simplified workflow net comprising a refinable place according to an embodiment of the present invention.
Figure 7B:
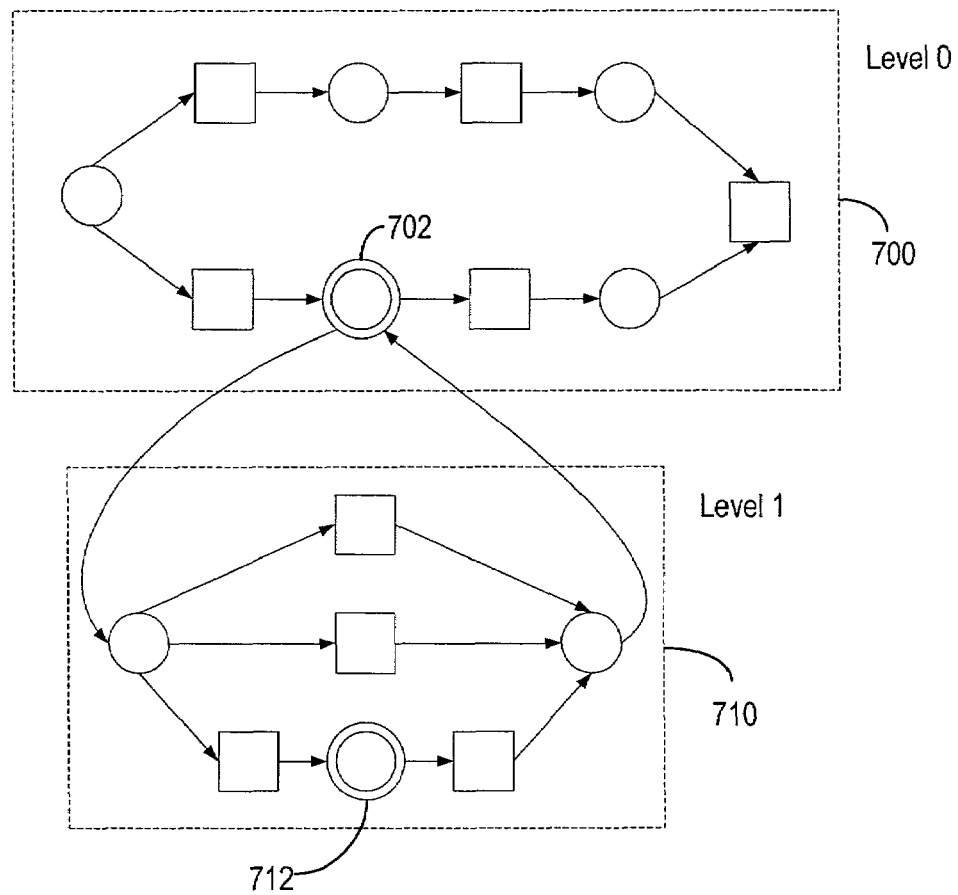
FIG. 7B depicts the simplified workflow of FIG. 7A with a first refinement net attached to a refinable place of the workflow according to an embodiment of the present invention.
Figure 7C:
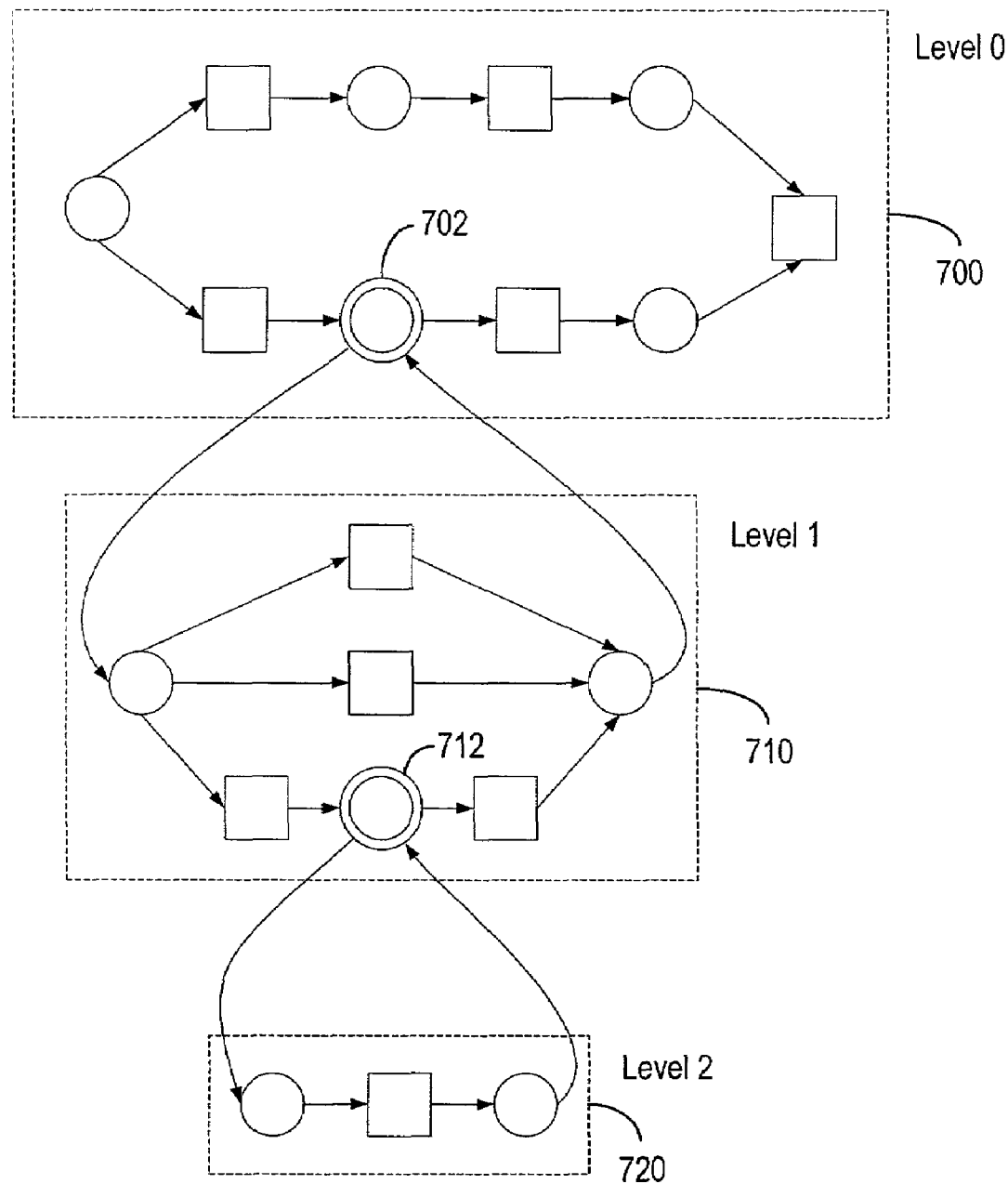
FIG. 7C depicts the simplified workflow of FIG. 7B with a second refinement net attached to a refinable place of the first refinement net workflow according to an embodiment of the present invention.

The process of attaching refinement nets at various levels according to an embodiment of the present invention is illustrated in FIGS. 7A, 7B, and 7C. FIG. 7A depicts a simplified workflow net 700 comprising a refinable place 702 according to an embodiment of the present invention. In FIG. 7B, a refinement net 710 has been attached to refinable place 702 of Petri net 700. Refinement net 710 may be attached to net 700 when a document comprising control information requisite for refinement of refinable place 702 enters refinable place 702. Petri net 700 may be considered to be at level 0 while refinement net 710 may be considered to be at level 1.

As shown in FIG. 7B, refinement net 710 comprises a refinable place 712. In FIG. 7C, a refinement net 720 has been attached to refinable place 712 of refinement net 710. Refinement net 720 may be attached when a document comprising control information requisite for refinement of refinable place 712 enters refinable place 712 of refinement net 710. Petri net 700 may be considered to be at level 0, refinement net 710 may be considered to be at level 1, and refinement net 720 may be considered to be at level 2. In a like manner, multiple levels of refinement nets may be attached to a workflow net based upon control information associated with a document being processed by the workflow net.

Figure 8:
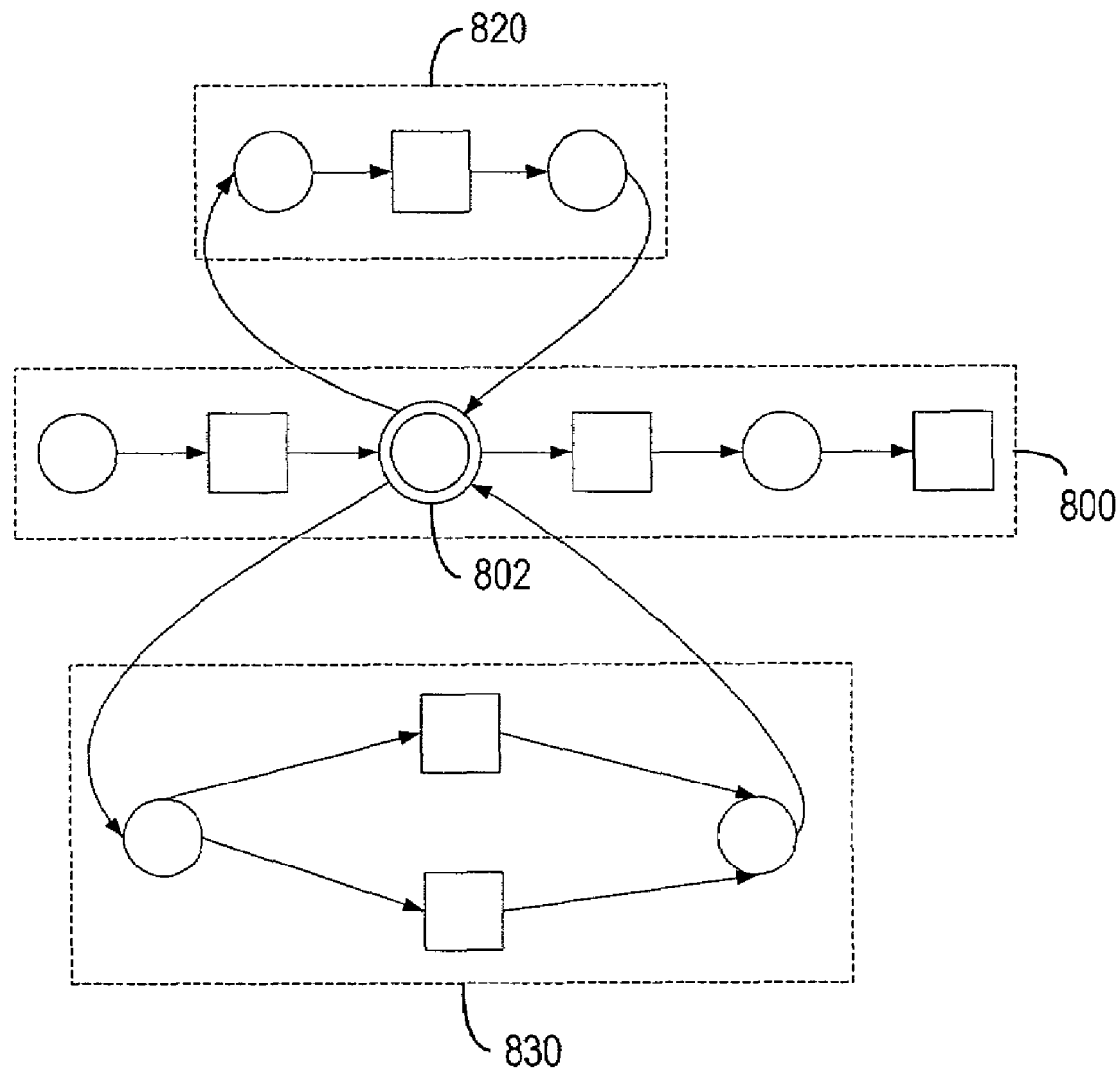
FIG. 8 depicts a simplified Petri net comprising a refinable place to which two refinement nets and are attached according to an embodiment of the present invention.

As described above, whether or not a particular refinement net is attached to a particular refinable place depends on the control information associated with a document entering the particular refinable place. Different documents may have different control information associated with them and may cause different refinement nets to be attached to a particular refinable place. For example, FIG. 8 depicts a simplified Petri net 800 representing a target document workflow comprising a refinable place 802 to which two refinement nets 820 and 830 are attached according to an embodiment of the present invention. Refinement net 820 may be attached to refinable place 802 when a first document comprising first control information enters refinable place 802. Refinement net 830 may be attached to refinable place 802 when a second document comprising second control information enters refinable place 802. Accordingly, one or more refinement nets may be attached to a refinable place according to the teachings of the present invention.

Further, as previously indicated, a refinement net attached to a refinable place based upon control information associated with a first document may not be deleted or detached from the refinable place even after the first document has been routed or processed via a workflow represented by the refinement net. In this embodiment, the refinement net remains attached to the refinable place even after the first document has been processed. Since multiple refinement nets may be attached to a refinable place (as depicted in FIG. 8), multiple refinement nets may remain attached to a refinable place even after the documents that triggered the refinement nets have been processed. A subsequent document arriving at the particular refinable place may then be processed using one of the refinement nets attached to the particular refinable place.

According to an embodiment of the present invention, workflow processing may also be controlled based upon permissions information associated with a document being processed and associated with the active document workflow used to process the document. For example, according to an embodiment of the present invention, permissions information associated with a document and associated with a particular refinable place is used to determine whether or not the document is permitted to refine (i.e., attach a refinement net to the refinable place) the particular refinable place. Further, assuming that a document is permitted to refine a particular refinable place, the permissions information may further be used to select or determine a particular refinement net from a list of one or more refinement nets to be attached to the refinable place and to be used for processing the document. Accordingly, the permissions information may determine the refinement net to be attached to the refinable place. Additionally, for a refinable place that has one or more refinement nets attached to it, the permissions information may also be used to determine if a particular document is permitted to detach or delete one or more of the attached refinement nets.

The permissions information associated with a document may be configured by the author of the document and may be included in the control information associated with the document. Permissions information for the workflow may be configured by the workflow designer and may be stored in a memory location accessible to WPS 302.

Figure 9:
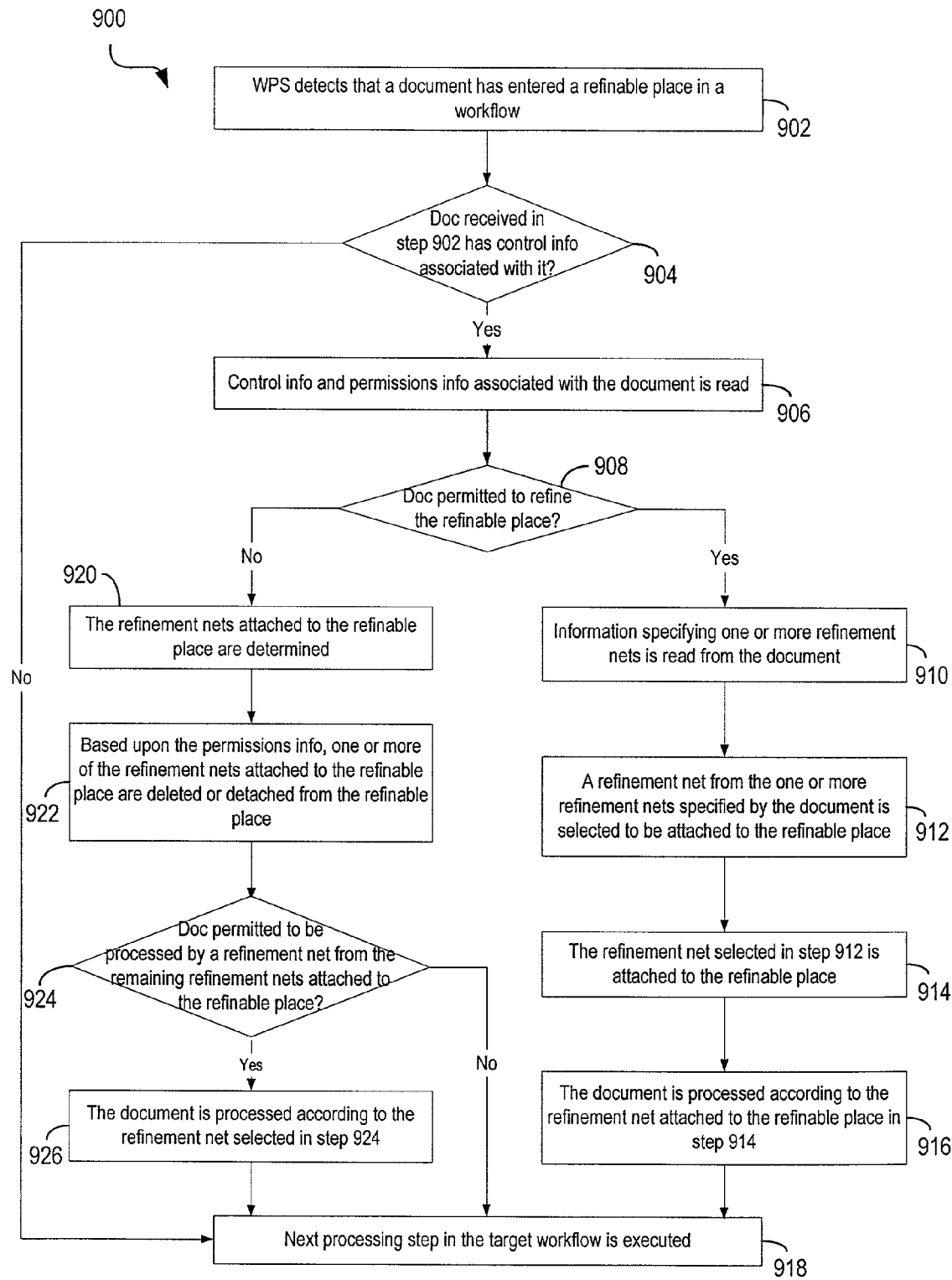
FIG. 9 is a simplified high-level flowchart depicting processing performed by a workflow processing system when a document enters a refinable place in a workflow net that is augmented with permissions information according to an embodiment of the present invention.

FIG. 9 is a simplified high-level flowchart 900 depicting processing performed by WPS 302 when a document enters a refinable place in a workflow net that is augmented with permissions information according to an embodiment of the present invention. Flowchart 900 depicted in FIG. 9 is merely illustrative of an embodiment incorporating the present invention and does not limit the scope of the invention as recited in the claims. One of ordinary skill in the art would recognize other variations, modifications, and alternatives.

The processing depicted in FIG. 9 may be performed by or controlled by WPS 302. For example, software modules executing on WPS 302 may perform the processing. As depicted in FIG. 9, processing is initiated when WPS 302 detects that a document has entered a refinable place in a workflow net (step 902). According to an embodiment of the present invention, WPS 302 may monitor the status of a document as it is routed through the workflow in order to determine when the document enters a refinable place in the workflow. For example, in the system depicted in FIG. 3 that implements the workflow represented by Petri net 200 depicted in FIGS. 2A and 2B, WPS 302 may determine that a document has entered refinable place 202 upon detecting that the document has been logged per transition 114. As described above, in a Petri net representation of the workflow, when a document enters a refinable place (e.g., refinable place 202), the document is deposited in input place $i_s$ of the refinable place (e.g., $i_s$ 502 depicted in FIG. 5).

WPS 302 then determines if control information, if any, is associated with the document (step 904). If WPS 302 determines that the document does not have any control information associated with it, then processing continues with the next workflow processing step (step 918). For example, for the workflow represented by Petri net 200 in FIGS. 2A and 2B, if the document does not contain any control information then processing continues with transition 118.

According to an embodiment of the present invention, if the document does not contain any control information, the document is processed through transition $t_s$ (e.g., transition $t_s$ 504) of the refinable place and then deposited in output place $o_s$ (e.g., $o_s$ 506) of the refinable place from where it is ready for the next operation in the workflow to be performed on it. According to an embodiment of the present invention, no operation is performed on the document in transition $t_s$ 504 (i.e., the document passes through unchanged). However, in alternative embodiments of the present invention, one or more operations specified by the workflow designer may be performed in transition $t_s$ 504.

If WPS 302 determines in step 904 that the document has control information associated with it, then the control information is read (step 906). The control information associated with the document may be read by WPS 302 or by a device or system (e.g., computer system 312 depicted in FIG. 3) under control of WPS 302. The control information read in step 906 may include permissions information associated with the document that may be configured by an author of the document.

WPS 302 then determines if the document is permitted to refine (i.e., attach a refine net) the refinable place (step 908). The determination is based upon permissions information associated with the document and based upon permissions information specified by the workflow designer for the refinable place. As indicated above, permissions information related to a refinable place may be stored in a memory location accessible to WPS 302.

Figure 10:
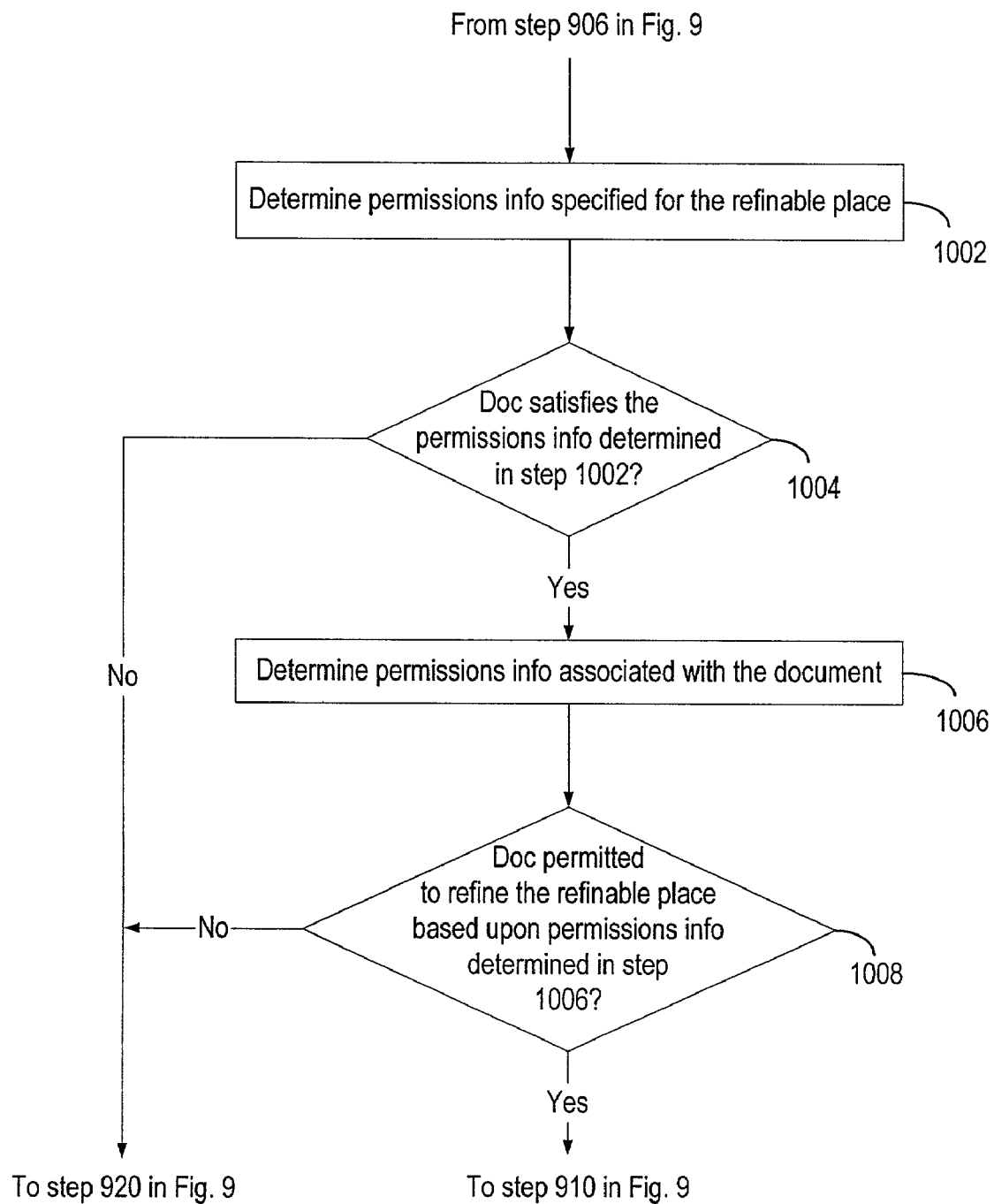
FIG. 10 is a simplified high-level flowchart depicting a method of determining if a document is permitted to refine a particular refinable place based upon permissions information associated with the document and/or the refinable place according to an embodiment of the present invention.

FIG. 10 is a simplified high-level flowchart depicting a method of determining if a document is permitted to refine a particular refinable place based upon permissions information associated with the document and/or the refinable place according to an embodiment of the present invention. The method depicted in FIG. 10 may be performed as part of step 908 in FIG. 9. The method depicted in FIG. 10 is merely illustrative of an embodiment incorporating the present invention and does not limit the scope of the invention as recited in the claims. One of ordinary skill in the art would recognize other variations, modifications, and alternatives.

As depicted in FIG. 10, WPS 302 first determines permissions information specified by a workflow designer for the particular refinable place (step 1002). According to the teachings of the present invention, only those documents that satisfy the permission information associated with the refinable place are allowed to refine the refinable place. For example, permissions information configured by a workflow designer for a particular refinable place may specify that the particular refinable place can only be refined by documents originating in the legal department of a company. Accordingly, only those documents that originate from the legal department of the company are permitted to refine that particular refinable place. Documents that do not originate from the legal department are not allowed to refine the particular refinable place. In other embodiments, the permissions information associated with a refinable place may specifically identify the documents that can refine the refinable place. Various other types of permissions information may also be specified for a refinable place.

WPS 302 then determines if the document that has entered the refinable place satisfies the permissions information associated with the refinable place (step 1004). If it is determined in step 1004 that the document does not satisfy the permissions information associated with the refinable place, it indicates that the document is not allowed to refine the refinable place, and processing continues with step 920 in FIG. 9.

If it is determined in step 1002 that the document satisfies the permissions information associated with the refinable place, then WPS 302 determines permissions information associated with the document (step 1006). As discussed above, the permissions information for the document may be included in the control information associated with the document. According to an embodiment of the present invention, the permissions information (which may be configured by the document author) associated with a document may specify refinable places that can be refined by the document. For example, a document processed by a workflow represented by Petri net 200 depicted in FIG. 2A may comprise permissions information specifying that the article can refine refinable place 202 after the article has been logged.

WPS 302 then determines if the document is permitted to refine the refinable place based upon permissions information associated with the document (step 1008). If it is determined in step 1008 that the permissions information associated with the document does not permit refinement of the refinable place, it indicates that the document is not allowed to refine the refinable place and processing continues with step 920 in FIG. 9. If it is determined in step 1008 that the permissions information associated with the document permits refinement of the refinable place, then processing continues with step 910 in FIG. 9.

Referring back to FIG. 9, if it is determined in step 908 that the document is permitted to refine the refinable place, then information specifying one or more refinements nets is read from the document (step 910). Information specifying the one or more refinement nets may be included in the control information associated with the document. If it is determined in step 908 that the document is not permitted to refine the refinable place, then processing continues with step 920.

After step 910, WPS 302 selects a refinement net from the one or more refinements specified by the document to be attached to the refinable place (step 912). Various different techniques may be used to select a particular refinement net to be attached to the refinable place from the one or more refinement nets specified by the document. According to an embodiment of the present invention, selection criteria is specified to facilitate selection of a particular refinement net such that a refinement net from the one or more refinement nets specified by the document that satisfies the selection criteria is selected to be attached to the refinable place. The selection criteria may be specified by the workflow designer or by the document author. If specified by the document author, the selection criteria may be included in the control information associated with the document. For example, a document author may specify that for a given refinable place, a refinement net with the least number of operations (transitions) is to be selected. Based upon this selection criterion, a refinement net with the least number of transitions may be chosen from the one or more refinement nets specified by the document. Various other selection criteria may be specified.

According to another embodiment of the present invention, a refinement net may be selected from the one or more refinement nets specified by the document based upon the resources available for processing the document. As previously indicated, the workflow designer may specify resources available for processing a document at a refinable place. In this embodiment, a refinement net that can be completed using the available resources may be selected from the one or more refinement nets to be attached to the refinable place.

According to an embodiment of the present invention, the one or more refinement nets specified by the document comprise at least one refinement net that satisfies the selection criteria. Accordingly, according to an embodiment of the present invention, it is guaranteed that at least one refinement net will be selected in step 912.

The refinement net selected in step 912 is then attached to the refinable place (step 914). As previously indicated, each refinement net comprises an input place $i_R$ and an output place $o_R$. When a refinement net is attached to a refinable place, the input place $i_R$ of the refinement net is attached to the input place $i_s$ of the refinable place and the output place $o_R$ of the refinement net is attached to the output place $i_s$ of the refinable place. The document is transferred from input place $i_s$ of the refinable place to input place $i_R$ of the refinement net. For example, in FIG. 2B, place 252 represents the $i_R$ of refinement net 250 and place 262 represents the output place $o_R$ of refinement net 250. Accordingly, if the document deposited in refinable place 202 triggers refinement net 250, the document is transferred from input place $i_s$ 502 of refinable place 202 to input place $i_R$ 252 of refinement net 250.

The document is then processed according to the refinement net attached to the refinable place in step 914 (step 916). Execution of the refinement net implies that the sequence of operations specified by a workflow represented by the refinement net is performed on the document. The operations specified by the workflow represented by the refinement net may be performed by WPS 302 or by other devices or systems controlled by WPS 302. The operations may require human intervention. For example, the refinement net may specify a first operation indicating that the text of the document is to be converted from Japanese to English, and a second operation indicating that the document is to be encrypted using PGP. The translation and encryption operations are then performed in step 916.

According to an embodiment of the present invention, after all the operations specified by the refinement net have been performed, the document is deposited into the output place $o_R$ of the refinement net. The document is then transferred from output place $o_R$ of the refinement net to output place $o_s$ of the refinable place. For example, the document is transferred from output place $o_R$ 262 of refinement net 250 to output place $o_s$ 506 of refinable place 202. Processing then continues with step 918 wherein further operations specified by the target workflow are performed.

If it is determined in step 908 that the document is not permitted to refine the refinable place, then WPS 302 determines all the refinement nets that are attached to the refinable place (step 920). As previously indicated, in certain embodiments of the present invention, a refinement net may not be detached from the refinable place even after a document that triggered the refinement net has been processed according to the refinement net. Accordingly, in step 920 WPS 302 determines the refinement nets that remain attached to the refinable place.

One or more of the refinement nets determined in step 920 are then deleted based upon permissions information associated with the document (step 922). According to an embodiment of the present invention, the permissions information associated with the document identifies refinement nets that the document is permitted to delete. If the refinement nets determined in step 920 included one or more nets that the document is permitted to delete, then those one or more nets are detached/deleted from the refinable place in step 922.

WPS 302 then determines if the document is permitted to be processed by a refinement net from the refinement nets that remain attached to the refinable place after step 922 (step 924). This is determined based on permissions information associated with the document and permissions information associated with the one or more refinement nets. If it is determined in step 924, that the document is permitted to be processed by a refinement net from the refinement nets that are attached to the refinable place, then the document is processed according to the refinement net identified in step 924 (step 926). As part of step 926, one or more operations specified by the workflow represented by the refinement net selected in step 924 are performed on the document.

In a Petri net representation, according to an embodiment of the present invention, after all the operations specified by the refinement net selected in step 924 have been performed, the document is deposited into the output place $o_R$ of the refinement net. The document is then transferred from output place $o_R$ of the refinement net to output place $o_s$ of the refinable place. For example, the document is transferred from output place $o_R$ 262 of refinement net 250 to output place $o_s$ 506 of refinable place 202. Processing then continues with step 918 wherein further operations specified by the target workflow are performed.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method of operating a computer device to process a document in a workflow system, the method in the computer device comprising:
    detecting when a document is at a place in a first workflow network that allows attachment of workflow networks associated with the document to the place of the first workflow network, the first workflow network specifying a plurality of operations to be performed on the document including a first operation and a second operation, the place occurring at a location in the first workflow network after the first operation and before the second operation is performed on the document;
    determining, when the document is at the place that allows attachment of workflow networks associated with the document, if a second workflow network specified by the document is permitted to be attached to the place of the first workflow network, the second workflow network specifying one or more operations to be performed on the document; and
    if the second workflow network specified by the document is permitted to be attached to the place of the first workflow network, attaching the second workflow network to the place of the first workflow network such that the document is processed according to the second workflow network before returning, upon completion of processing of the document according to the second workflow, to the place of the first workflow network to continue processing of the document according to the first workflow network before the second operation specified by the first workflow network is performed on the document,
    wherein the first workflow network comprises a first Petri net and the second workflow comprises a second Petri net.

2. The method of claim 1 wherein the first workflow network is configured by a workflow designer and the second workflow network is configured by an author of the document.

3. The method of claim 1 wherein detecting when the document is at the place in the first workflow network comprises:
    detecting when the first operation has been performed on the document.

4. The method of claim 1 wherein determining if the second workflow network specified by the document is permitted to be attached to the place of the first workflow network comprises:
    determining permissions information specified for the place; and
    determining that the second workflow network specified by the document is permitted to be attached to the place of the first workflow if the document satisfies the permissions information specified for the place.

5. The method of claim 4 wherein the permissions information specified for the place is configured by a designer of the first workflow network.

6. The method of claim 1 wherein determining if the second workflow network specified by the document is permitted to be attached to the place of the first workflow network comprises:
    determining permissions information associated with the document; and
    determining that the second workflow network specified by the document is permitted to be attached to the place of the first workflow if the permissions information associated with the document permits the attachment.

7. The method of claim 6 wherein the permissions information associated with the document is configured by an author of the document.

8. The method of claim 1 wherein attaching the second workflow network to the place of the first workflow network such that the document is processed according to the second workflow network before the second operation specified by the first workflow network is performed on the document comprises:
    performing at least one operation from the one or more operations specified by the second workflow network on the document before performing the second operation specified by the first workflow network on the document.

9. The method of claim 1 wherein attaching the second workflow network to the place of the first workflow network such that the document is processed according to the second workflow network before the second operation specified by the first workflow network is performed on the document comprises:
    identifying a set of one or more workflow networks specified by the document;
    identifying a workflow network from the set of workflow networks that satisfies a selection criterion; and
    processing the second document according to the workflow network identified from the set of workflow networks before performing the second operation specified by the first workflow network on the document.

10. The method of claim 1 wherein the second workflow network attached to the place of the first workflow network comprises a place of the second workflow network that allows attachment of workflow networks associated with the document at the place of the second workflow network.

11. The method of claim 1 further comprising:
    if the second workflow network specified by the document is not permitted to be attached to the place of the first workflow network:
        determining a set of workflow networks attached to the place of the first workflow network;
        identifying at least one workflow network from the set of workflow networks for processing the document; and
        processing the document according to the at least one workflow network before performing the second operation specified by the first workflow network on the document.

12. The method of claim 1 further comprising:
    if the second workflow network specified by the document is not permitted to be attached to the place of the first workflow network:
        determining a first set of workflow networks attached to the place of the first workflow network;
        based upon permissions information associated with the document, detaching one or more workflow networks included in the first set of workflow networks from the place such that a second set of workflow networks remain attached to the place;
        identifying at least one workflow network from the second set of workflow networks for processing the document; and
        processing the document according to the at least one workflow network before performing the second operation specified by the first workflow network on the document.

13. A method of operating a computer device to process a document according to a first workflow network, the first workflow network specifying a plurality of operations to be performed, the plurality of operations including a first operation and a second operation following the first operation, the method in the computer device comprising:
    subsequent to performing the first operation and before performing the second operation, determining if the document is permitted to be processed by a second workflow network specified by the document at a location in the first workflow network that allows the document to be processed according to other workflow networks associated with the document, the second workflow network specifying one or more operations to be performed on the document; and
    if the document is permitted to be processed by the second workflow network at the location that allows the document to be processed according to other workflow networks associated with the document, processing the document according to the second workflow network and returning to the location, upon completion of processing of the document according to the second workflow, to continue processing of the document according to the first workflow network before the second operation specified by the first workflow network is performed,
    wherein the first workflow network comprises a first Petri net and the second workflow comprises a second Petri net.

14. The method of claim 13 wherein the first workflow network is configured by a workflow designer and the second workflow network is configured by an author of the document.

15. The method of claim 13 wherein determining if the document is permitted to be processed by the second workflow network specified by the document comprises:
    determining permissions information specified for the first workflow network; and
    determining that the document is permitted to be processed by the second workflow network if the document satisfies the permissions information specified for the first workflow network.

16. The method of claim 15 wherein the permissions information specified for the first workflow network is configured by a designer of the first workflow network.

17. The method of claim 13 wherein determining if the document is permitted to be processed by the second workflow network specified by the document comprises:
    determining permissions information associated with the document; and
    determining if the document is permitted to be processed by the second workflow network specified by the document based upon the permissions information associated with the document.

18. The method of claim 17 wherein the permissions information associated with the document is configured by an author of the document.

19. The method of claim 13 wherein processing the document according to the second workflow network comprises:
    identifying a set of one or more workflow networks specified by the document;
    identifying a workflow network from the set of workflow networks that satisfies a selection criterion; and
    processing the second document according to the workflow network identified from the set of workflow networks before performing the second operation specified by the first workflow network.

20. The method of claim 13 wherein processing the document according to the second workflow network comprises:
    performing at least one operation from the one or more operations specified by the second workflow network before performing the second operation specified by the first workflow network.

21. The method of claim 13 further comprising:
    if the document is not permitted to be processed by the second workflow network:
    identifying a set of workflow networks;
    identifying at least one workflow network from the set of workflow networks for processing the document; and
    processing the document according to the at least one workflow network before performing the second operation specified by the first workflow network.

22. The method of claim 13 further comprising:
    if the document is not permitted to be processed by the second workflow network:
    identifying a first set of workflow networks;
    based upon permissions information associated with the document, deleting one or more workflow networks from the first set of workflow networks;
    identifying at least one workflow network from workflow networks remaining in the first set of workflow networks for processing the document; and
    processing the document according to the at least one workflow network before performing the second operation specified by the first workflow network.

23. A computer program product having a computer readable storage medium storing instructions executable by a processor of a computer system for processing a document in a workflow system, the computer program product comprising:
    code for detecting when a document is at a place in a first workflow network that allows attachment of workflow networks associated with the document to the place of the first workflow network, the first workflow network specifying a plurality of operations to be performed on the document including a first operation and a second operation, the place occurring at a location in the first workflow network after the first operation and before the second operation is performed on the document;
    code for determining, when the document is at the place that allows attachment of workflow networks associated with the document, if a second workflow network specified by the document is permitted to be attached to the place of the first workflow network, the second workflow network specifying one or more operations to be performed on the document; and
    if the second workflow network specified by the document is permitted to be attached to the place of the first workflow network, code for attaching the second workflow network to the place of the first workflow network such that the document is processed according to the second workflow network before returning, upon completion of processing of the document according to the second workflow, to the place of the first workflow network to continue processing of the document according to the first workflow network before the second operation specified by the first workflow network is performed on the document, wherein the first workflow network comprises a first Petri net and the second workflow comprises a second Petri net.

24. The computer program product of claim 23 wherein the first workflow network is configured by a workflow designer and the second workflow network is configured by an author of the document.

25. The computer program product of claim 23 wherein the code for detecting when the document is at the place in the first workflow network comprises:
   code for detecting when the first operation has been performed on the document.

26. The computer program product of claim 23 wherein the code for determining if the second workflow network specified by the document is permitted to be attached to the place of the first workflow network comprises:
   code for determining permissions information specified for the place; and
   code for determining that the second workflow network specified by the document is permitted to be attached to the place of the first workflow if the document satisfies the permissions information specified for the place.

27. The computer program product of claim 26 wherein the permissions information specified for the place is configured by a designer of the first workflow network.

28. The computer program product of claim 23 wherein the code for determining if the second workflow network specified by the document is permitted to be attached to the place of the first workflow network comprises:
   code for determining permissions information associated with the document; and
   code for determining that the second workflow network specified by the document is permitted to be attached to the place of the first workflow if the permissions information associated with the document permits the attachment.

29. The computer program product of claim 28 wherein the permissions information associated with the document is configured by an author of the document.

30. The computer program product of claim 23 wherein the code for attaching the second workflow network to the place of the first workflow network such that the document is processed according to the second workflow network before the second operation specified by the first workflow network is performed on the document comprises:
   code for performing at least one operation from the one or more operations specified by the second workflow network on the document before performing the second operation specified by the first workflow network on the document.

31. The computer program product of claim 23 wherein the code for attaching the second workflow network to the place of the first workflow network such that the document is processed according to the second workflow network before the second operation specified by the first workflow network is performed on the document comprises:
   code for identifying a set of one or more workflow networks specified by the document;
   code for identifying a workflow network from the set of workflow networks that satisfies a selection criterion; and
   code for processing the second document according to the workflow network identified from the set of workflow networks before performing the second operation specified by the first workflow network on the document.

32. The computer program product of claim 23 wherein the second workflow network attached to the place of the first workflow network comprises a place of the second workflow network that allows attachment of workflow networks associated with the document at the place of the second workflow network.

33. The computer program product of claim 23 further comprising:
   if the second workflow network specified by the document is not permitted to be attached to the place of the first workflow network:
      code for determining a set of workflow networks attached to the place of the first workflow network;
      code for identifying at least one workflow network from the set of workflow networks for processing the document; and
      code for processing the document according to the at least one workflow network before performing the second operation specified by the first workflow network on the document.

34. The computer program product of claim 23 further comprising:
   if the second workflow network specified by the document is not permitted to be attached to the place of the first workflow network:
      code for determining a first set of workflow networks attached to the place of the first workflow network;
      based upon permissions information associated with the document, code for detaching one or more workflow networks included in the first set of workflow networks from the place such that a second set of workflow networks remain attached to the place;
      code for identifying at least one workflow network from the second set of workflow networks for processing the document; and
      code for processing the document according to the at least one workflow network before performing the second operation specified by the first workflow network on the document.

35. A computer program product having a computer readable storage medium storing instructions executable by a processor of a computer system for processing a document according to a first workflow network, the first workflow network specifying a plurality of operations to be performed, the plurality of operations including a first operation and a second operation following the first operation, the computer program product comprising:
   code for determining, subsequent to performing the first operation and before performing the second operation, if the document is permitted to be processed by a second workflow network specified by the document at a location of the first workflow network that allows the document to be processed according to other workflow networks associated with the document, the second workflow network specifying one or more operations to be performed on the document; and
   if the document is permitted to be processed by the second workflow network at the location that allows the document to be processed according to other workflow networks associated with the document, code for processing the document according to the second workflow network before returning to the location, upon completion of processing of the document according to the second workflow, to continue processing of the document according to the first workflow network before the second operation specified by the first workflow network is performed on the document, wherein the first workflow network comprises a first Petri net and the second workflow comprises a second Petri net.

36. The computer program product of claim 35 wherein the first workflow network is configured by a workflow designer and the second workflow network is configured by an author of the document.

37. The computer program product of claim 35 wherein the code for determining if the document is permitted to be processed by the second workflow network specified by the document comprises:
   code for determining permissions information specified for the first workflow network; and
   code for determining that the document is permitted to be processed by the second workflow network if the document satisfies the permissions information specified for the first workflow network.

38. The computer program product of claim 37 wherein the permissions information specified for the first workflow network is configured by a designer of the first workflow network.

39. The computer program product of claim 35 wherein the code for determining if the document is permitted to be processed by the second workflow network specified by the document comprises:
   code for determining permissions information associated with the document; and
   code for determining if the document is permitted to be processed by the second workflow network specified by the document based upon the permissions information associated with the document.

40. The computer program product of claim 39 wherein the permissions information associated with the document is configured by an author of the document.

41. The computer program product of claim 35 wherein the code for processing the document according to the second workflow network comprises:
   code for identifying a set of one or more workflow networks specified by the document;
   code for identifying a workflow network from the set of workflow networks that satisfies a selection criterion; and
   code for processing the second document according to the workflow network identified from the set of workflow networks before performing the second operation specified by the first workflow network on the document.

42. The computer program product of claim 35 wherein the code for processing the document according to the second workflow network comprises:
   code for performing at least one operation from the one or more operations specified by the second workflow network before performing the second operation specified by the first workflow network.

43. The computer program product of claim 35 further comprising:
   if the document is not permitted to be processed by the second workflow network:
      code for identifying a set of workflow networks;
      code for identifying at least one workflow network from the set of workflow networks for processing the document; and
      code for processing the document according to the at least one workflow network before performing the second operation specified by the first workflow network.

44. The computer program product of claim 35 further comprising:
   if the document is not permitted to be processed by the second workflow network:
      code for identifying a first set of workflow networks;
      based upon permissions information associated with the document, code for deleting one or more workflow networks from the first set of workflow networks;
      code for identifying at least one workflow network from workflow networks remaining in the first set of workflow networks for processing the document; and
      code for processing the document according to the at least one workflow network before performing the second operation specified by the first workflow network.

45. A workflow processing system comprising:
   one or more computer systems configured to perform a plurality operations on a document specified by a first workflow network, the plurality of operations including a first operation and a second operation, the first workflow network comprising a place that allows attachment of workflow networks associated with the document to the place of the first workflow network and that occurs at a location in the first workflow network after the first operation and before the second operation is performed on the document; and
   a workflow controller coupled to the one or more computer systems;
   wherein the workflow controller is configured to:
      detect when the document is at the place in the first workflow network that allows attachment of workflow networks associated with the document;
      determine, when the document is at the place that allows attachment of workflow networks associated with the document, if a second workflow network specified by the document is permitted to be attached to the place of the first workflow network, the second workflow network specifying one or more operations to be performed on the document; and
      if the second workflow network specified by the document is permitted to be attached to the place of the first workflow network, attach the second workflow network to the place of the first workflow network such that the document is processed according to the second workflow network before returning, upon completion of processing of the document according to the second workflow, to the place of the first workflow network to continue processing of the document according to the first workflow network before the second operation specified by the first workflow network is performed on the document,
   wherein the first workflow network comprises a first Petri net and the second workflow comprises a second Petri net.

46. The workflow processing system of claim 45 wherein the first workflow network is configured by a workflow designer and the second workflow network is configured by an author of the document.

47. The workflow processing system of claim 45 wherein the workflow controller is configured to detect when the document is at the place in the first workflow network by detecting when the first operation has been performed on the document.

48. The workflow processing system of claim 45 wherein the workflow controller is configured to determine if the second workflow network specified by the document is permitted to be attached to the place of the first workflow network by:

determining permissions information specified for the place; and determining that the second workflow network specified by the document is permitted to be attached to the place of the first workflow if the document satisfies the permissions information specified for the place.

49. The workflow processing system of claim 48 wherein the permissions information specified for the place is configured by a designer of the first workflow network.

50. The workflow processing system of claim 45 wherein the workflow controller is configured to determine if the second workflow network specified by the document is permitted to be attached to the place of the first workflow network by:

determining permissions information associated with the document; and determining that the second workflow network specified by the document is permitted to be attached to the place of the first workflow if the permissions information associated with the document permits the attachment.

51. The workflow processing system of claim 50 wherein the permissions information associated with the document is configured by an author of the document.

52. The workflow processing system of claim 45 wherein the workflow controller is configured to attach the second workflow network to the place of the first workflow network such that the document is processed according to the second workflow network before the second operation specified by the first workflow network is performed on the document by:

causing at least one operation from the one or more operations specified by the second workflow network to be performed on the document before the second operation specified by the first workflow network is performed on the document.

53. The workflow processing system of claim 45 wherein the workflow controller is configured to attach the second workflow network to the place of the first workflow network such that the document is processed according to the second workflow network before the second operation specified by the first workflow network is performed on the document by:

identifying a set of one or more workflow networks specified by the document;

identifying a workflow network from the set of workflow networks that satisfies a selection criterion; and causing the second document to be processed according to the workflow network identified from the set of workflow networks before the second operation specified by the first workflow network is performed on the document.

54. The workflow processing system of claim 45 wherein the second workflow network attached to the place of the first workflow network comprises a place of the second workflow network that allows attachment of workflow networks associated with the document at the place of the second workflow network.

55. The workflow processing system of claim 45 wherein the workflow controller is further configured to:

if the second workflow network specified by the document is not permitted to be attached to the place of the first workflow network:

determine a set of workflow networks attached to the place of the first workflow network;

identify at least one workflow network from the set of workflow networks for processing the document; and cause the document to be processed according to the at least one workflow network before the second operation specified by the first workflow network is performed on the document.

56. The workflow processing system of claim 45 wherein the workflow controller is further configured to:

if the second workflow network specified by the document is not permitted to be attached to the place of the first workflow network:

determine a first set of workflow networks attached to the place of the first workflow network;

based upon permissions information associated with the document, detach one or more workflow networks included in the first set of workflow networks from the place such that a second set of workflow networks remain attached to the place;

identify at least one workflow network from the second set of workflow networks for processing the document; and cause the document to be processed according to the at least one workflow network before the second operation specified by the first workflow network is performed on the document.

57. A workflow processing system comprising:

one or more computer systems configured to process a document according to a first workflow network, the first workflow network specifying a plurality of operations to be performed, the plurality of operations including a first operation and a second operation following the first operation; and a controller system coupled to the one or more computer systems;

wherein the controller system is configured to:

subsequent to performing the first operation and before performing the second operation, determine if the document is permitted to be processed by a second workflow network specified by the document at a location in the first workflow network that allows the document to be processed according to other workflow networks associated with the document, the second workflow network specifying one or more operations to be performed on the document; and if the document is permitted to be processed by the second workflow network at the location that allows the document to be processed according to other workflow networks, cause the document to be processed according to the second workflow network before returning to the location, upon completion of processing of the document according to the second workflow, to continue processing of the document according to the first workflow network before the second operation specified by the first workflow network is performed, wherein the first workflow network comprises a first Petri net and the second workflow comprises a second Petri net.

58. The workflow processing system of claim 57 wherein the first workflow network is configured by a workflow designer and the second workflow network is configured by an author of the document.

59. The workflow processing system of claim 57 wherein the controller system is configured to determine if the document is permitted to be processed by the second workflow network specified by the document by:

determining permissions information specified for the first workflow network; and determining that the document is permitted to be processed by the second workflow network if the document satisfies the permissions information specified for the first workflow network.

60. The workflow processing system of claim 59 wherein the permissions information specified for the first workflow network is configured by a designer of the first workflow network.

61. The workflow processing system of claim 57 wherein the controller system is configured to determine if the document is permitted to be processed by the second workflow network specified by the document by:

determining permissions information associated with the document; and determining if the document is permitted to be processed by the second workflow network specified by the document based upon the permissions information associated with the document.

62. The workflow processing system of claim 61 wherein the permissions information associated with the document is configured by an author of the document.

63. The workflow processing system of claim 57 wherein the controller system is configured to cause the document to be processed according to the second workflow network by:

identifying a set of one or more workflow networks specified by the document;

identifying a workflow network from the set of workflow networks that satisfies a selection criterion; and causing the second document to be processed according to the workflow network identified from the set of workflow networks before the second operation specified by the first workflow network is performed.

64. The workflow processing system of claim 57 wherein the controller system is configured to cause the document to be processed according to the second workflow network by:

causing at least one operation from the one or more operations specified by the second workflow network to be performed before the second operation specified by the first workflow network is performed.

65. The workflow processing system of claim 57 wherein the controller system is further configured to:

if the document is not permitted to be processed by the second workflow network:

identify a set of workflow networks;

identify at least one workflow network from the set of workflow networks for processing the document; and cause the document to be processed according to the at least one workflow network before the second operation specified by the first workflow network is performed.

66. The workflow processing system of claim 57 wherein the controller system is further configured to:

if the document is not permitted to be processed by the second workflow network:

identify a first set of workflow networks;

based upon permissions information associated with the document, delete one or more workflow networks from the first set of workflow networks;

identify at least one workflow network from workflow networks remaining in the first set of workflow networks for processing the document; and cause the document to be processed according to the at least one workflow network before the second operation specified by the first workflow network is performed.

67. A method of operating a computer device to process a document in a workflow system, the method in the computer device comprising:

detecting when a document, processed according to a first work flow network, is permitted to be processed according to one or more workflow networks specified by the document, the first workflow network specifying a plurality of operations to be performed on the document including a first operation and a second operation, the location of document in the first workflow network permitting the document to be processed according to the one or more workflow networks being positioned after the first operation and before the second operation is performed on the document;

determining when the document is at the location permitting the document to be processed according to the one or more workflow networks, if the document is permitted to be processed according to a second workflow network specified by the document such that processing the document according to the second workflow network returns, upon completion of processing of the document according to the second workflow, to the location to continue processing of the document according to the first workflow network, the second workflow network specifying one or more operations to be performed on the document; and if the document is permitted to be processed according to the second workflow network, processing the document according to the second workflow network before the second operation specified by the first workflow network is performed on the document, wherein the first workflow network comprises a first Petri net and the second workflow comprises a second Petri net.

* * * * *